United States Patent
Harata et al.

(10) Patent No.: US 12,168,432 B2
(45) Date of Patent: Dec. 17, 2024

(54) VEHICLE DEVICE

(71) Applicant: DENSO CORPORATION, Kariya (JP)

(72) Inventors: Yuzo Harata, Kariya (JP); Sho Nakamura, Kariya (JP); Kazuhiro Uehara, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 18/190,212

(22) Filed: Mar. 27, 2023

(65) Prior Publication Data

US 2023/0234549 A1 Jul. 27, 2023

Related U.S. Application Data

(63) Continuation of application No. 16/211,437, filed on Dec. 6, 2018, now Pat. No. 11,685,359, which is a
(Continued)

(30) Foreign Application Priority Data

Jun. 9, 2016 (JP) .................................. 2016-115307

(51) Int. Cl.
*B60W 10/06* (2006.01)
*B60R 16/02* (2006.01)
(Continued)

(52) U.S. Cl.
CPC ............. *B60W 10/06* (2013.01); *B60R 16/02* (2013.01); *B60W 10/10* (2013.01); *B60W 10/30* (2013.01);
(Continued)

(58) Field of Classification Search
CPC ...... B60W 10/06; B60W 10/10; B60W 10/30; B60R 16/02; B60R 16/023; B60R 25/24; G06F 8/654; G06F 11/3058
See application file for complete search history.

(56) References Cited

U.S. PATENT DOCUMENTS

| | | | |
|---|---|---|---|
| 6,694,235 B2 | 2/2004 | Akiyama | |
| 8,463,489 B2 | 6/2013 | Mao et al. | |
| 9,213,521 B2 | 12/2015 | Horio et al. | |
| 9,524,160 B2 | 12/2016 | Takahashi et al. | |
| 2011/0320089 A1* | 12/2011 | Lewis | H04L 67/34 380/278 |
| 2013/0197712 A1* | 8/2013 | Matsuura | G06F 11/3013 701/1 |

(Continued)

FOREIGN PATENT DOCUMENTS

| | | |
|---|---|---|
| CN | 102736925 A | 10/2012 |
| DE | 102014215407 A1 | 2/2015 |

(Continued)

*Primary Examiner* — Andrew J Cromer
(74) *Attorney, Agent, or Firm* — Harness, Dickey & Pierce, P.L.C.

(57) ABSTRACT

A vehicle system includes: a reprogramming slave device that is an electronic control unit (hereinafter, referred to as ECU) to be a target of updating an update file of a program stored among a plurality of the ECUs; a reprogramming master device that transmits the update file to the reprogramming slave device in response to a request from a terminal operable by a vehicle user to control updating of the program stored in the reprogramming slave device; and a determination unit that determines traveling propriety of a vehicle when the update file is rewritten in the reprogramming slave device. The vehicle device functions as the reprogramming master device, and includes: an obtaining unit that obtains the traveling propriety determined by the determination unit; and a notification command unit that commands a notification medium to notify information of the traveling propriety obtained by the obtaining unit.

27 Claims, 21 Drawing Sheets

Related U.S. Application Data continuation of application No. PCT/JP2017/014672, filed on Apr. 10, 2017.

(51) Int. Cl.
| | |
|---|---|
| *B60W 10/10* | (2012.01) |
| *B60W 10/30* | (2006.01) |
| *B60W 50/00* | (2006.01) |
| *G06F 8/65* | (2018.01) |
| *G06F 11/00* | (2006.01) |
| *G06F 16/182* | (2019.01) |
| *H04L 67/00* | (2022.01) |
| *H04L 67/12* | (2022.01) |

(52) U.S. Cl.
CPC ............... *G06F 8/65* (2013.01); *G06F 11/00* (2013.01); *G06F 16/183* (2019.01); *H04L 67/12* (2013.01); *H04L 67/34* (2013.01); *B60W 2050/0004* (2013.01)

(56) References Cited

U.S. PATENT DOCUMENTS

| | | | |
|---|---|---|---|
| 2015/0040113 | A1 | 2/2015 | Muench-Casanova et al. |
| 2015/0301822 | A1* | 10/2015 | Takahashi ............. B60R 16/023 717/173 |
| 2019/0108014 | A1 | 4/2019 | Nakamura et al. |
| 2019/0111907 | A1 | 4/2019 | Harata et al. |

FOREIGN PATENT DOCUMENTS

| | | | |
|---|---|---|---|
| DE | 112013005705 | T5 | 9/2015 |
| JP | 2003019931 | A | 1/2003 |
| JP | 2003046536 | A | 2/2003 |
| JP | 2006-82648 | A | 3/2006 |
| JP | 2010093347 | A | 4/2010 |
| JP | 2010170304 | A | 8/2010 |
| JP | 5347997 | B2 | 11/2013 |
| JP | 2013238993 | A | 11/2013 |
| JP | 2014106875 | A | 6/2014 |
| JP | 2014221608 | A | 11/2014 |
| JP | 2017220091 | A | 12/2017 |

* cited by examiner

FIG. 7

| | CAN ID | NAME OF ECU | CONNECTION BUS | TRAVELING PROPRIETY |
|---|---|---|---|---|
| TRANSMISSION TOOL | REPLY: ECU | — | — | — |
| IN CASE OF STANDARD ADDRESS FORMAT | | | | |
| | 700 | DOOR | BODY SYSTEM BUS | PERMITTED |
| | 701 | NAVIGATION | MULTIMEDIA SYSTEM BUS | PERMITTED |
| | 702 | POWER STEERING | TRAVELING SYSTEM BUS | PROHIBITED |
| | 7E0 | ENGINE | TRAVELING SYSTEM BUS | PROHIBITED |
| ID OF 7□ | VALUE IN WHICH 8 IS ADDED TO 7□ | □□ECU | | PERMITTED/ PROHIBITED |
| IN CASE OF EXTENDED ADDRESS FORMAT | | | | |
| | 750 | — | — | — |
| | 750N_TA | 00: METER | BODY SYSTEM BUS | PERMITTED |
| | 758N_TA | 01: AIR CONDITIONER | BODY SYSTEM BUS | PERMITTED |

TA1

VEHICLE DEVICE

CROSS REFERENCE TO RELATED APPLICATIONS

The present application is a continuation application of U.S. patent application Ser. No. 16/211,437 filed on Dec. 6, 2018 which is a continuation application of International Patent Application No. PCT/JP2017/014672 filed on Apr. 10, 2017, which designated the United States and claims the benefit of priority from Japanese Patent Application No. 2016-115307 filed on Jun. 9, 2016. The entire disclosures of all of the above applications are incorporated herein by reference.

TECHNICAL FIELD

The present disclosure relates to a vehicle device.

BACKGROUND

A number of electronic control units (ECUs) are mounted on a vehicle, and the electronic control units control vehicle equipment via an in-vehicle network and in collaboration with each other.

SUMMARY

The present disclosure provides a vehicle device that obtains traveling propriety and commands a notification medium to notify information of the traveling propriety.

BRIEF DESCRIPTION OF DRAWINGS

The above and other objects, features and advantages of the present disclosure will become more apparent from the following detailed description made with reference to the accompanying drawings. In the drawings:

FIG. 7 is a content explanatory drawing of a traveling propriety determination table;

DETAILED DESCRIPTION

Figure 1:
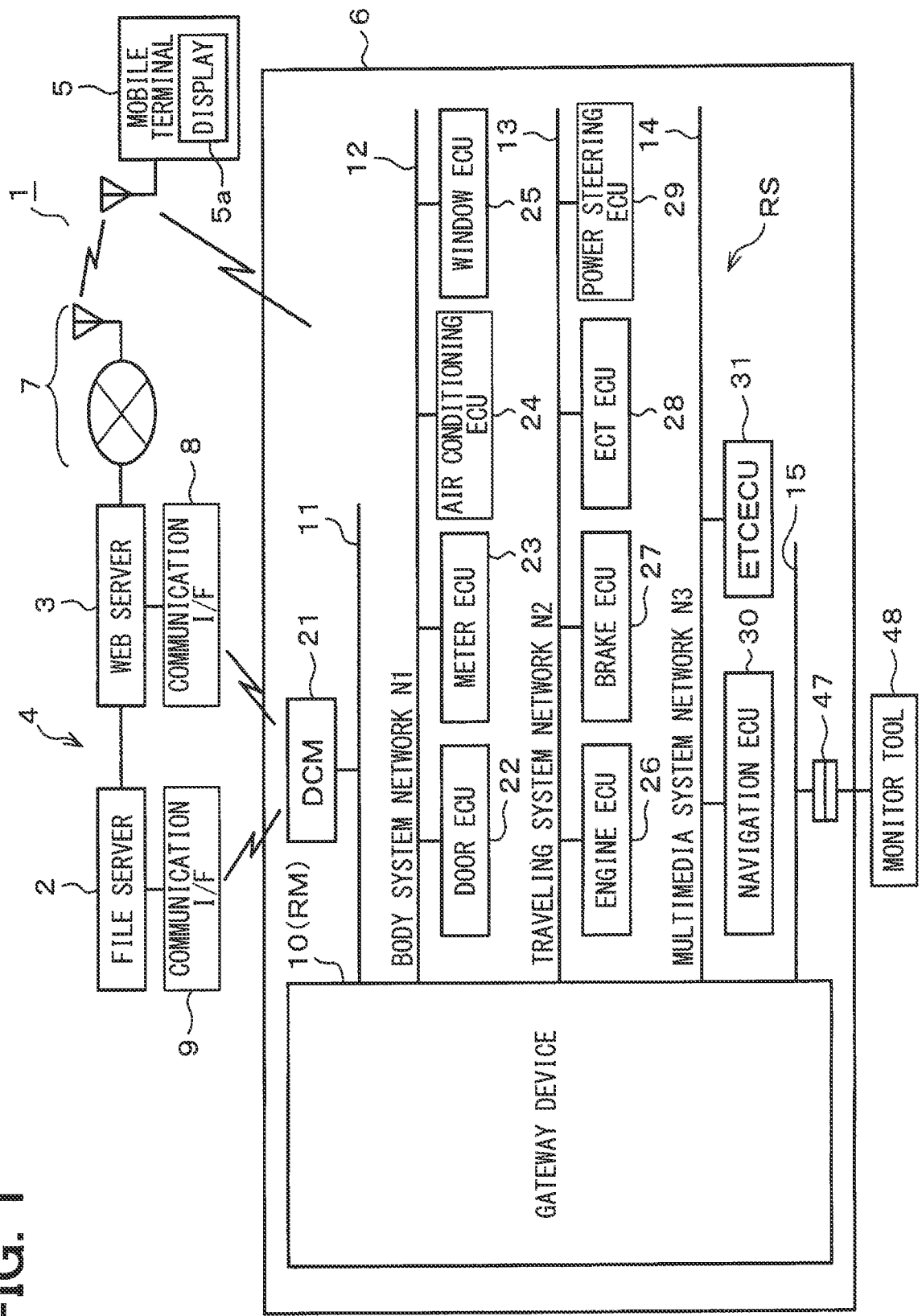
FIG. 1 is a block diagram schematically illustrating a configuration of a vehicle system in a first embodiment.

A technique has been proposed that updates a program stored in an internal memory of the electronic control unit. A program update device receives an update file for updating a program from a center device to update the program corresponding to the update file.

Updating of a program becomes possible by connecting to the in-vehicle network using various wireless communication techniques. However, there is a possibility in that program update processing can be undesirably performed even under an environment that allows a vehicle user to perform driving operation of a vehicle when remote update is performed by wireless communication in response to a request from a terminal operable by the vehicle user. In such a case, there is a possibility in that the vehicle user undesirably performs driving operation of the vehicle even during rewriting of the program. For example, there is a possibility in that the vehicle may unintentionally behave undesirably when the vehicle user performs driving operation under insufficient program rewriting processing.

The present disclosure provides a vehicle device that enables a vehicle user to safely perform driving operation to ensure safety when a program is updated in response to a request from a terminal operable by the vehicle user.

According to an aspect of the present disclosure, when a vehicle user operates a terminal to request updating a program, the reprogramming master device controls the update of the program stored in the reprogramming slave device according to the request. The obtaining unit of the reprogramming master device obtains travel propriety determined by the determination unit, and then the notification command unit commands a notification medium to notify information of the traveling propriety.

Accordingly, when a request is made from the terminal operated by the vehicle user, a notification medium can be notified of information of traveling propriety, making it possible to adequately notify the vehicle user of traveling propriety. When being notified that traveling is permitted via the notification medium, the vehicle user determines that traveling is permitted, so that the vehicle user can perform driving operation safely. Furthermore, when being notified that traveling is prohibited, the user determines that traveling is prohibited, so that the vehicle user stops driving. This enables to ensure safety.

The present disclosure provides a vehicle device that enables a vehicle user to safely perform driving operation to ensure safety when a program is updated in response to a request from a terminal operable by the vehicle user.

Hereinafter, several embodiments of a vehicle device will be described with reference to the drawings. In each embodiment described below, the component performing same or similar operation is indicated using the same or similar reference numeral to omit their description as needed. Note that, in the following embodiments, the same or similar component is illustrated using the same reference numeral in their tens digit and ones digit.

First Embodiment

FIG. 1 to FIG. 14 are diagrams illustrating a first embodiment. As illustrated in FIG. 1, a vehicle system 1 of the embodiment is a system that allows updating of a program implemented in a vehicle electronic control unit (hereinafter, referred to as ECU) installed in a vehicle, and includes a center device 4 including a file server 2 and a web server 3, a mobile terminal (equivalent to terminal) 5 owned and operable by a vehicle user and wirelessly connectable to the web server 3, and an in-vehicle system 6 mounted on the vehicle, which are mutually connected. As described below, a monitor tool 48 is externally connectable with the in-vehicle system 6.

The file server 2 and the web server 3 are connected with a network. The web server 3 is communicable between the mobile terminal 5 via a network 7 outside the vehicle. The web server 3 is also communicable between the in-vehicle system 6 via a communication interface 8. The network 7 outside the vehicle denotes various communication networks such as, for example, a mobile communication network by 3G network, 4G network, or the like, Internet network, or a wireless LAN (e.g., Wi-Fi (registered trademark)).

In the file server 2, files for updating a program are accumulated by a program provider. The file server 2 has a program management function, and can transmit the update file to the in-vehicle system 6 of the vehicle mounting thereon the ECU that needs update processing via a communication interface 9.

The in-vehicle system 6 in the vehicle includes a central gateway device (CGW: hereinafter abbreviated as gateway device) 10, buses 11 to 15 of an onboard LAN connected to the gateway device 10, a data communication module (hereinafter, abbreviated as DCM) 21 connected to the buses 11 to 15, and various ECUs 22 to 31, and is operated by receiving battery voltage supplied. The DCM 21 is an interface module for data communication between the center device 4 and the mobile terminal 5 via wireless communication.

The gateway device 10 is communicable with the file server 2, the web server 3, and the mobile terminal 5, which are exterior, using the DCM 21. The gateway device 10 has a function as a reprogramming master device RM that downloads an update file from the file server 2, and transmits the update file to the ECU that is a target of updating a program for update control. The reprogramming master device RM is abbreviation of a master device for reprogramming.

Hereinafter, program update processing is referred to as "reprogramming", and the ECU that is a target of updating program is referred to as a reprogramming slave device RS as needed. The reprogramming slave device RS is abbreviation of a slave device for reprogramming. Herein, not less than any one of the ECUs 22 to 31 become the reprogramming slave device RS.

Figure 2:
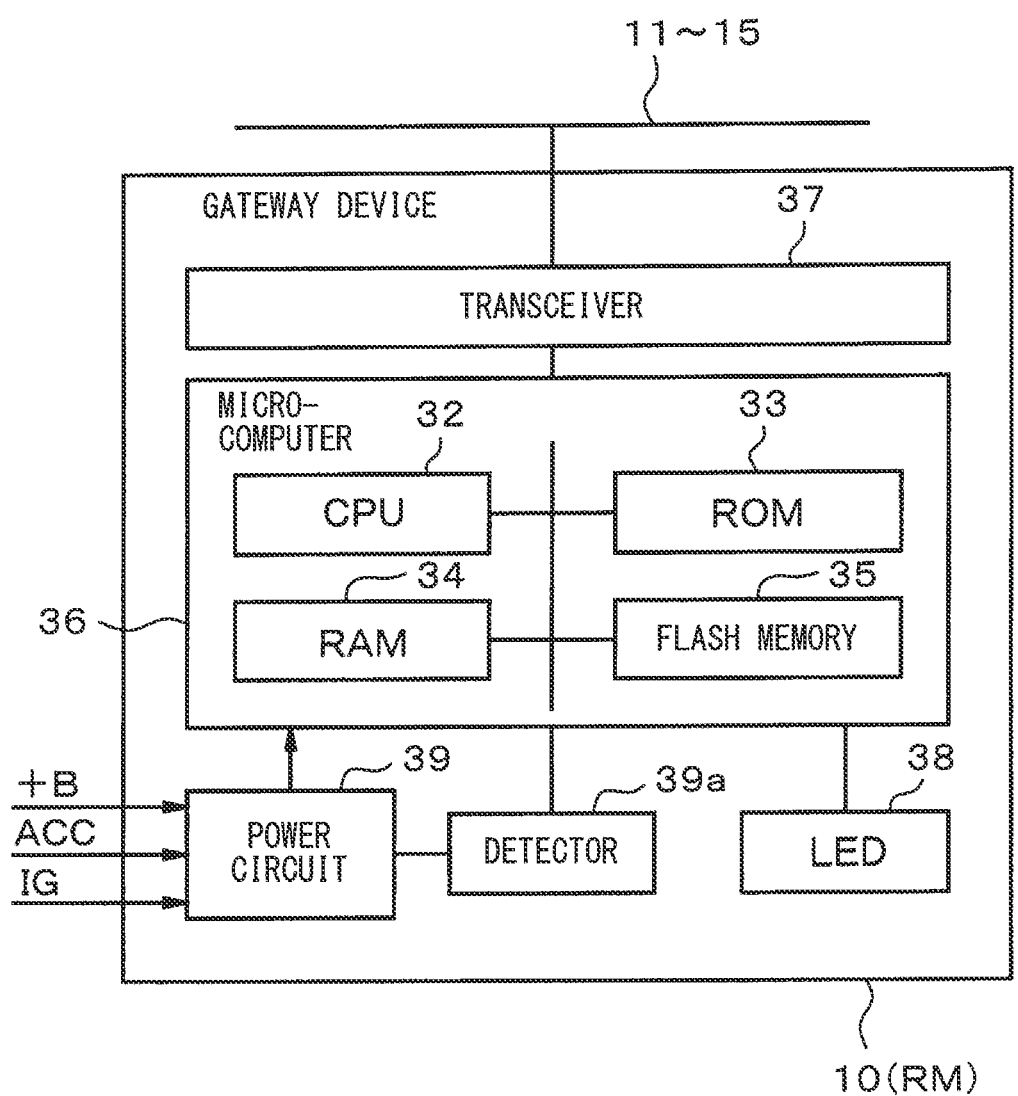
FIG. 2 is a block diagram illustrating an electrical configuration example of a gateway device.

FIG. 2 illustrates an electrical configuration example of the gateway device 10. The gateway device 10 is connected to all of the plurality of buses 11 to 15. The gateway device 10 includes a microcomputer 36 including a CPU 32, a ROM 33, a RAM 34, and a flash memory 35, and a transceiver 37, and performs, by the CPU 32, various processing on the basis of a program stored in a memory as a non-transition recording medium. The gateway device 10 is operated by using a power circuit 39 to which power source is input from a battery power source +B for operating the vehicle device, and has a built-in timer. To the power circuit 39, an accessory power source AC and an ignition power source IG are also input.

For example, an LED 38 is connected to the microcomputer 36 of the gateway device 10, making it possible to display internal information (e.g., traveling propriety, progress of reprogramming) exteriorly by making the LED 38 be lightened/blinked by the microcomputer 36.

The buses 11 to 15 of the onboard LAN illustrated in FIG. 1 are composed by, for example, a plurality of networks whose communication protocols are same or different with each other, and the networks can be divided into, for example, a plurality of networks such as a body system network N1, a traveling system network N2, a multimedia system network N3, and the like. The various ECUs 22 to 31 are connected to the buses 12 to 14 of the networks N1 to N3.

To the bus (hereinafter, referred to as body system bus) 12 of the body system network N1, the ECUs are connected such as the door ECU 22 having various functions for controlling lock/unlock of doors, the meter ECU 23 having various functions for controlling display of meters that becomes targets of control, the air conditioner ECU 24 for controlling an air conditioner, and the window ECU 25 for controlling opening/closing of window glasses. The ECUs 22 to 25 are referred to as the body system ECUs 22 to 25 as needed. The door ECU 22 is configured by connecting thereto a door lock motor.

Also, ECUs having respective functions (e.g., air-bag ECU having air-back control function, keyless entry ECU having keyless entry control function based on operation of a wireless key, a smart key, or the like) may be connected to the body system bus 12, but their drawings and descriptions are omitted. For example, the meter ECU 23 is an electronic control unit for making a display such as an instrument panel display various items of information such as vehicle speed based on vehicle speed information, engine rotational speed based on engine rotational speed information, gasoline remaining information obtained from a remaining amount sensor (not shown).

To the bus (hereinafter, referred to as traveling system bus) 13 of the traveling system network N2, for example, power train system ECUs such as the engine ECU 26 having various functions for controlling an engine that becomes a target of control, the brake ECU 27 having various functions for controlling a brake, the ECT ECU 28 having various functions for controlling an automatic transmission, and the power steering ECU 29 for controlling a power steering are connected. The ECUs 26 to 29 are referred to as traveling system ECUs 26 to 29 as needed. The engine ECU 26 makes the vehicle travelable by driving an engine that uses, for example, gasoline fuel.

Furthermore, besides the ECUs, an ECU having various functions (e.g., a parking ECU for detecting on/off state of parking brake, or the like) is connected to the traveling system bus 13, but its description is omitted. Although being not illustrated in the drawings, various sensors such as a vehicle speed sensor, a throttle opening sensor, and an accelerator pedal opening sensor are connected to the engine ECU 26. Furthermore, a brake pedal sensor is connected to the brake ECU 27. A sensor for detecting an on/off state of the above-mentioned parking brake may be connected to the brake ECU 27.

Also, a shift lever position sensor and the like are connected to the ECT ECU 28. Positions for the shift lever are positions for, for example, parking (P), reverse (R), neutral (N), drive (D), and the like, and the ECT ECU 28 can detect the positions by the shift lever position sensor.

To the bus (hereinafter, referred to as multimedia system bus) 14 of the multimedia system network N3, ECUs are connected, for example, such as the navigation ECU (hereinafter, referred to as navi ECU) 30 for controlling a navigation device that becomes a target of control, and the ETC ECU 31 for controlling an electronic type toll collection system (ETC: registered trademark). The ECUs 30, 31 are referred to as the multimedia system ECUs 30, 31 as needed. The ECUs 30, 31 are vehicle electronic control units for controlling, as a target of control, an electronic component of a multimedia system for providing various items of information to user.

Figure 3:
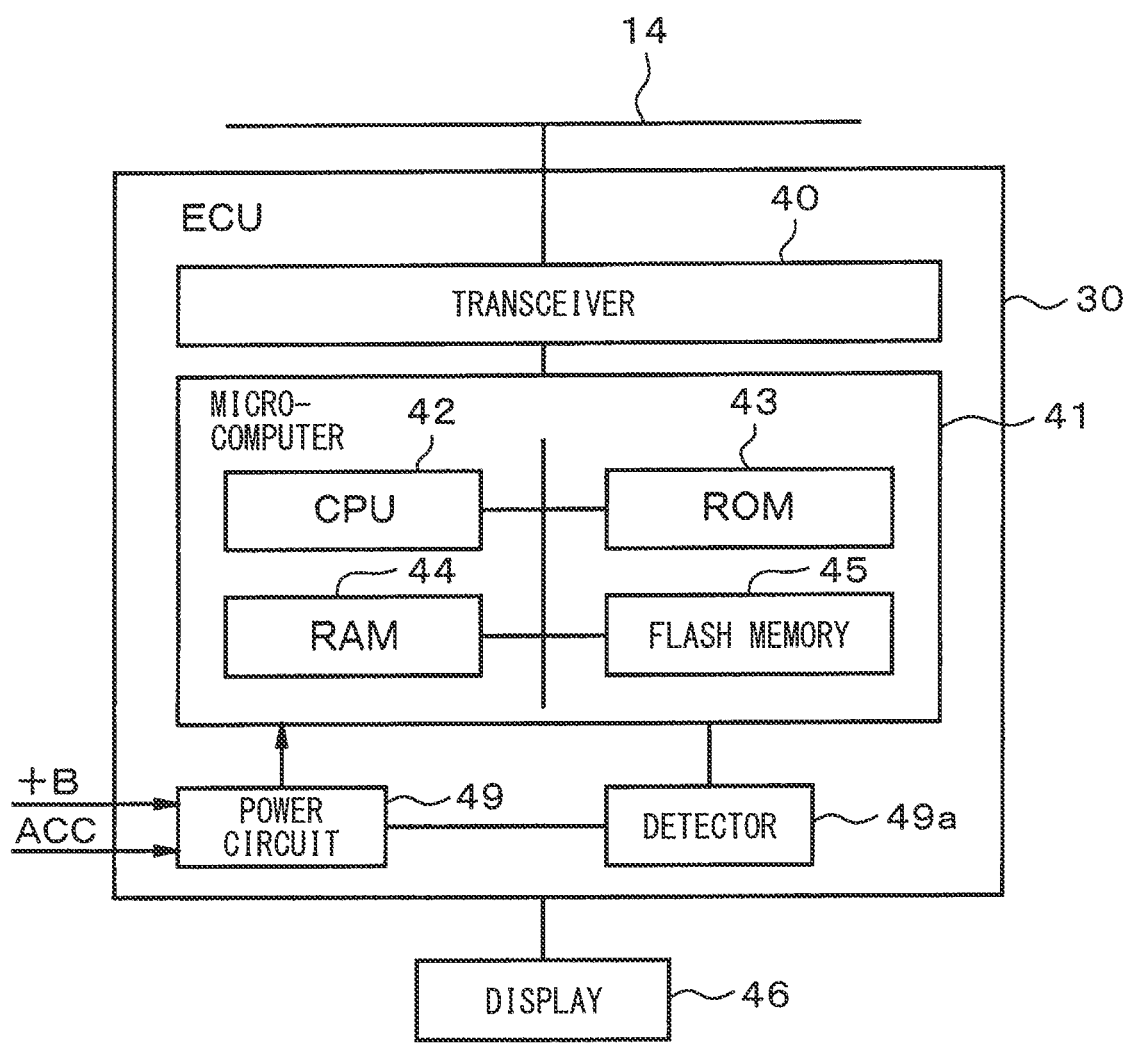
FIG. 3 is a block diagram illustrating an electrical configuration example of an ECU.

FIG. 3 illustrates a basic electric configuration example of the various ECUs such as the navi ECU. For example, the navi ECU 30 includes a transceiver 40 for performing export/import of data to/from the bus 14, and a microcomputer 41 for communicating with another ECU using a communication controller (not shown) for controlling communication via the bus 14 to provide various functions assigned to the own ECU in conjunction with the other ECU. The microcomputer 41 includes a CPU 42, a ROM 43, a RAM 44, and a flash memory 45. The CPU 42 performs various processing on the basis of a program stored in the memory as a non-transition recording medium. The gateway device 10 is operated by using an output voltage of a power circuit 49 in which power source is input from the battery power source +B. To the navi ECU 30, various recording devices are connected, and map data, music data, and the like are respectively stored in the recording devices. Then, the navi ECU 30 periodically transmits present location information of the vehicle obtained on the basis of the map data of a position detector (e.g., GPS receiver or the like) and the recording device to the multimedia system bus 14.

Although loads (sensor, actuator) connected to the ECUs 22 to 31 may be different from each other, the ECUs 22 to 31 have a hardware structure substantially equal to that of the navi ECU 30 illustrated in FIG. 3. Also, like the examples illustrated in FIG. 2 and FIG. 3, the gateway device 10 or the ECUs 22 to 31 includes detectors 39a, 49a that detect a voltage value of the battery power source +B, a voltage value of the accessory power source ACC, and a voltage value of the ignition power source IG, and compare them with respective predetermined threshold values to output compared results to the microcomputer 36, 46.

To all of or any of the ECUs 22 to 31, a temperature sensor (not shown) for obtaining operating temperature of the corresponding ECUs 22 to 31 is connected, and each of the ECUs 22 to 31 can obtain information of operating temperature by obtaining sensor information of the corresponding temperature sensor.

Also, to the body system ECUs 22 to 25, a switch signal based on an ignition switch or a push button for starting/stopping the engine is input, and the microcomputer 41 of the body system ECUs 22 to 25 control on/off of outputs of the accessory power source ACC and the ignition power source IG depending on the switch signal using a relay (not shown).

When the switch signal is OFF, only the battery power source +B is supplied to the ECU that is a target of supply, and in the case where the signal indicates the ACC, the accessory power source ACC is supplied to the ECU (not less than any one of 22 to 31) that is a target of supply, and in the case where the signal indicates the IG, the ignition power source IG is supplied to the ECU (not less than any one of 22 to 31) that is a target of supply with the accessory power source ACC.

Figure 4:
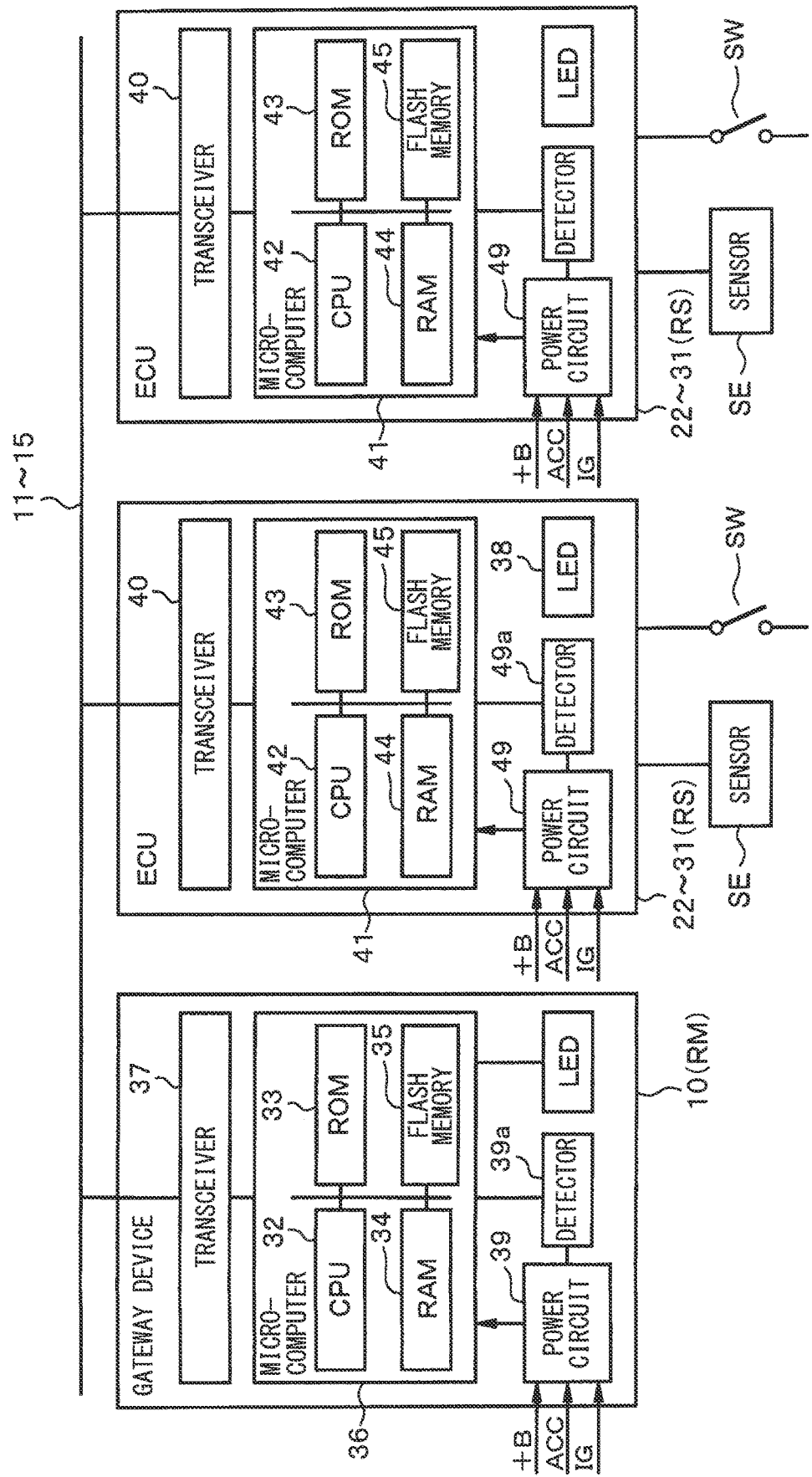
FIG. 4 is a block diagram illustrating a partial configuration of a network connection mode.

As illustrated in FIG. 4, although each of the ECUs 22 to 31 is connected to the gateway device 10 via network, a sensor SE such as the above-mentioned various sensors and a switch SW are connected to each of the ECUs 22 to 31. The sensor SE collectively denotes various sensors (e.g., vehicle speed sensor, water temperature sensor, camera, engine rotating speed, temperature sensor, air temperature sensor, gasoline remaining amount sensor) connected to each of the ECUs 22 to 31, and the switch SW collectively denotes various switches (e.g., ignition switch, detection sensor of on/off state of parking brake, shift lever position sensor, lock position switch, determination switch of sheet belt, seating switch, and the like) connected to each of the ECUs 22 to 31.

Not less than any one of a large number of ECUs 22 to 31 (e.g., the navi ECU 30) is configured by connecting thereto a display 46. Hereinafter, description will be made on the assumption that the display 46 is connected to the navi ECU 30. The display 46 is a vehicle display device such as a center information display (CID), a head-up display (HUD), or the like. The display 46 may be a meter display of an instrument panel.

Figure 6A:
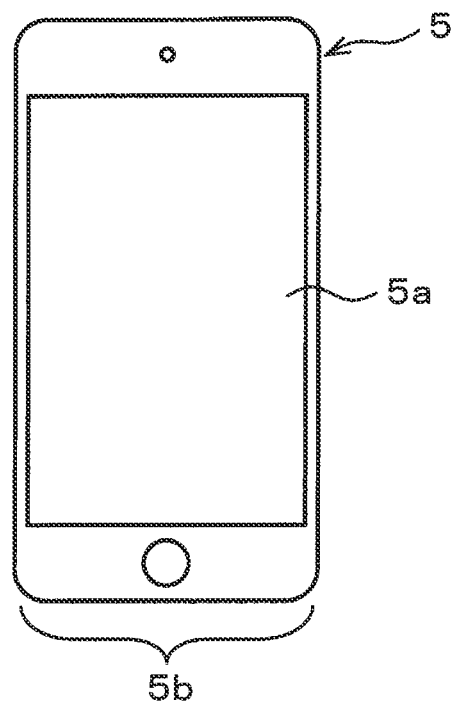
FIG. 6A is an external view of the mobile terminal and a vehicle display device.
Figure 6B:
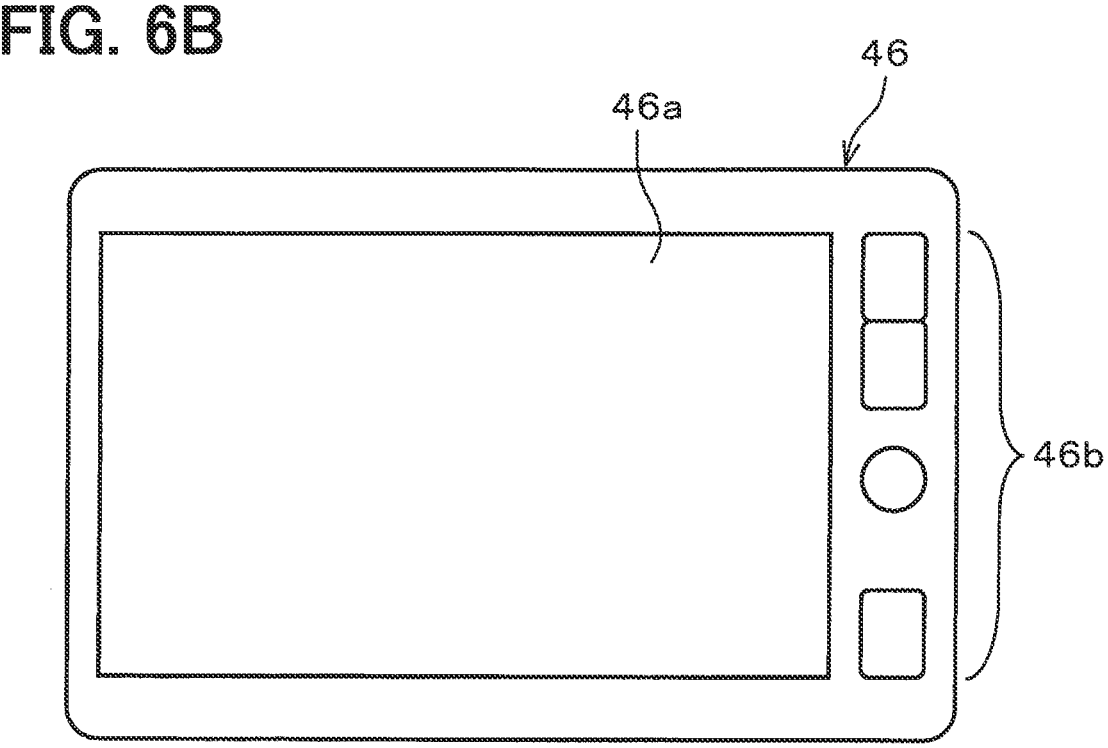
FIG. 6B is an external view of the vehicle display device.

FIG. 6B illustrates an external view of the CID as the display 46, and the display 46 mounts thereon a display unit 46a and an operation unit 46b. The operation unit 46b is configured using an operation switch group mounted beside the display unit 46a of the display 46, or/and a touch panel under the display screen of the display unit 46a, which are operable by the vehicle user. When the operation unit 46b is operated by the user, a signal according to the operation is transmitted to the navi ECU 30, and the microcomputer 41 of the navi ECU 30 performs various processing.

Figure 5:
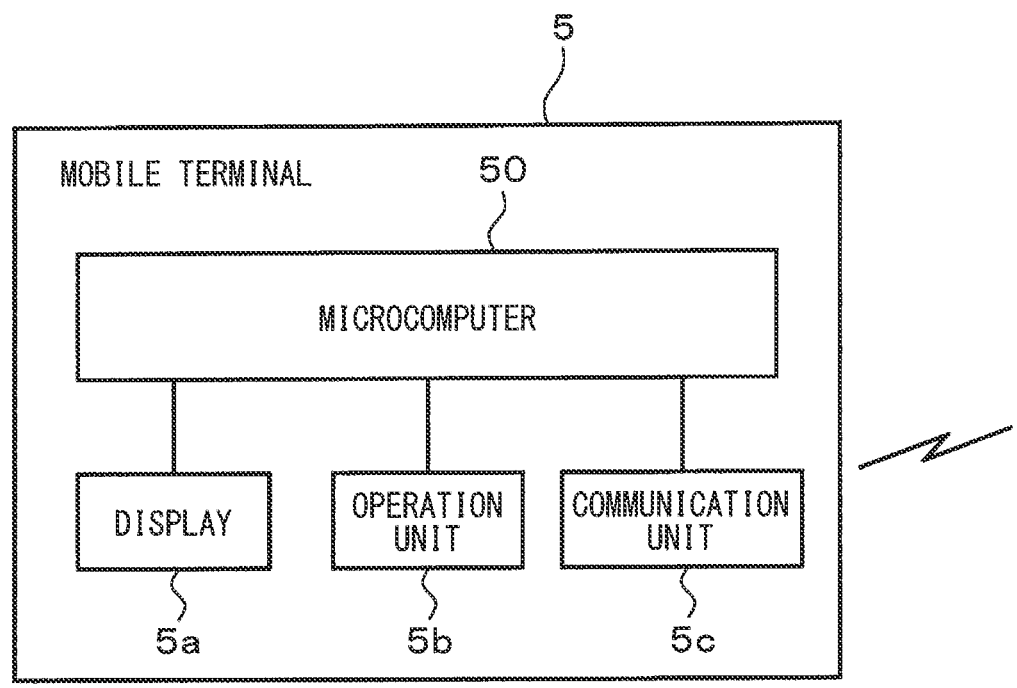
FIG. 5 is a block diagram illustrating an electrical configuration example of a mobile terminal.

Like the electrical configuration example of the mobile terminal 5 illustrated in FIG. 5, the mobile terminal 5 includes a display 5a, an operation unit 5b, as well as a communication unit 5c, and a microcomputer 50. The microcomputer 50 includes a CPU, a ROM, a RAM, and the like (which are not shown), and performs various processing such as accepting processing of operational information of the operation unit 5b and display processing on the display 5a on the basis of a program stored in the memory as a non-transition recording medium. The microcomputer 50 can access to the DCM 21 illustrated in FIG. 1 by near field wireless communication (e.g., Bluetooth (registered trademark)) besides the network 7 outside the vehicle using the communication unit 5c. In the memory of the microcomputer 50 of the mobile terminal 5, an application (e.g., browser) to access to the web server 3 is preliminarily installed depending on user instruction, and update instruction of the program can be performed via the web server 3 by execution of the application by the user. Furthermore, FIG. 6A illustrates an external view of the mobile terminal 5 that includes the display 5a and the operation unit 5b in appearance.

The program stored inside the microcomputer 41 of each of the ECUs 22 to 31 illustrated in FIG. 1 is a program necessary to control, by each of the ECUs, control target equipment assigned to the own ECU, and is composed of an update file that becomes a target of update and another file that is not a target of update. That is, the update file denotes at least a part or all of program files among all of the program files.

Furthermore, as illustrated in FIG. 1, the gateway device 10 is connected to the bus 15 of a network for development, test, and analysis, and on-board diagnostics (OBD) connector 47 is connected to the bus 15. The OBD connector 47 is capable of connecting thereto a monitor tool 48 from outside when, for example, a vehicle designer, a dealer, or a worker of repair shop needs.

The gateway device 10 receives all data transmitted to all the buses 11 to 15, and detects state in the vehicle, that is, operation state by the driver, vehicle state, and vehicle behavior. The gateway device 10 also includes, in the flash memory 35, a traveling propriety determination table TA1 in which conditions to permit updating of a program are regulated for each of the ECUs 22 to 31.

As illustrated in FIG. 7, in the traveling propriety determination table TA1, relation information is described in which traveling propriety of each of the ECUs 22 to 31 and CAN ID, the connection bus, and name for connecting the ECUs 22 to 31 are associated. In the traveling propriety determination table TA1, the traveling propriety need not be described in association with all of CAN ID, connection bus, and name, and it is sufficient that the traveling propriety be described so as to be associated with any one of CAN ID, connection bus, and name.

A part of the contents of the traveling propriety determination table TA1 will be described. For example, the door ECU 22 is connected to the body system bus 12, and it is described that when the monitor tool 48 or the gateway device 10 transmits a request by applying 0x700 as CAN ID, the door ECU 22 accepts the request, and the door ECU 22 replies to the request by applying 0x708 as CAN ID, and that traveling is permitted (traveling propriety=permitted) also during updating of program for the door ECU 22.

Furthermore, for example, the power steering ECU 29 is connected to the traveling system bus 13, and it is described that when the monitor tool 48 or the gateway device 10 transmits a request using 0x702 as CAN ID to the power steering ECU 29 via the bus 13, the power steering ECU 29 accepts the request and returns a reply using 0x70A as CAN ID, and that the traveling is prohibited (traveling propriety=prohibited) also during updating of inner program for the power steering 29.

Furthermore, also in another ECU, it is described that when the monitor tool 48 or the gateway device 10 transmits a request by applying a number of 700s as CAN ID, the corresponding ECU accepts the request and the ECU sends a reply by applying a number in which 8 is added to the CAN ID received, and information of traveling propriety is stored so as to be associated with the individual ECUs. As illustrated in FIG. 7, the relation information in which the CAN ID, the name of ECU, the connection bus, and the traveling propriety are associated is also associated in, for example, a standard format and an extended format defined in the CAN specification in the same manner.

The contents illustrated in FIG. 7 are schematically and collectively described. In the traveling propriety determination table TA1, it is described that traveling is prohibited during updating of the inner program for the traveling system ECUs 26 to 29, and it is described that traveling is permitted even during updating of the inner program for the multimedia system ECUs 30, 31 in an association manner. Furthermore, it is stored that traveling is permitted also during updating of the inner program for the meter ECU 23 and the air conditioner ECU 24 connected to the body system bus 12. In the traveling propriety determination table TA1, update conditions during traveling/stopping of the vehicle (e.g., high or low of battery remaining amount, high or low of connection bus load, high or low of vehicle load, in-vehicle temperature condition, and the like) may be set in detail, and traveling propriety information may be associated with the update conditions to be stored as relation information, and exceptional conditions may be provided to them for setting.

Then, in the microcomputer 36 of the gateway device 10, its CPU performs program update processing by referencing the traveling propriety determination table TA1 stored in the flash memory 35 on the basis of the program stored in the memory.

Hereinafter, flow of the program update processing in the overall system will be described with reference to sequence diagrams in FIG. 8, FIG. 9 and display screens in FIG. 9 to FIG. 13.

In the following description, an example will be described. In the example, the vehicle is supposed whose in-vehicle device (e.g., engine start/stop, that is, turning on the power source ACC, IG, and the like) can be remotely operated from outside the vehicle using a wireless key or a smart key by the user as well as progress of program update processing is made to be displayed on the display 5a of the mobile terminal 5 owned by the user. Furthermore, display contents of the display 5a of the mobile terminal 5 in the following description for operation may be subjected to display processing on the display 46 by the navi ECU 30, so that description will be added as needed.

Figure 8:
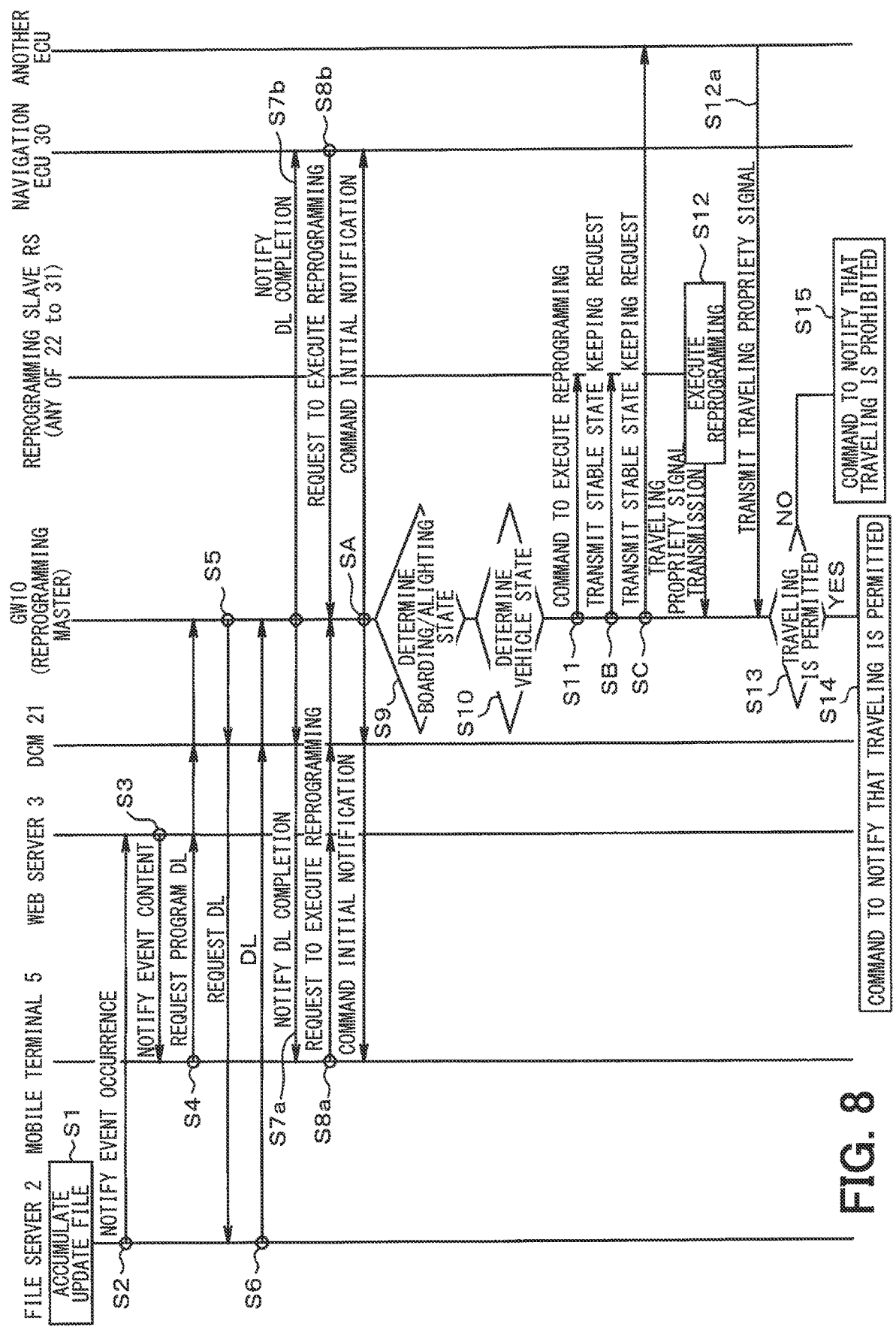
FIG. 8 is a sequence diagram illustrating an overall operation.

Furthermore, the processing of the gateway device 10 in FIG. 8 illustrated below is processing performed by executing the program by the microcomputer 36, and the processing of the mobile terminal 5 is processing performed by executing the program by the microcomputer 50 built-in.

Figure 10:
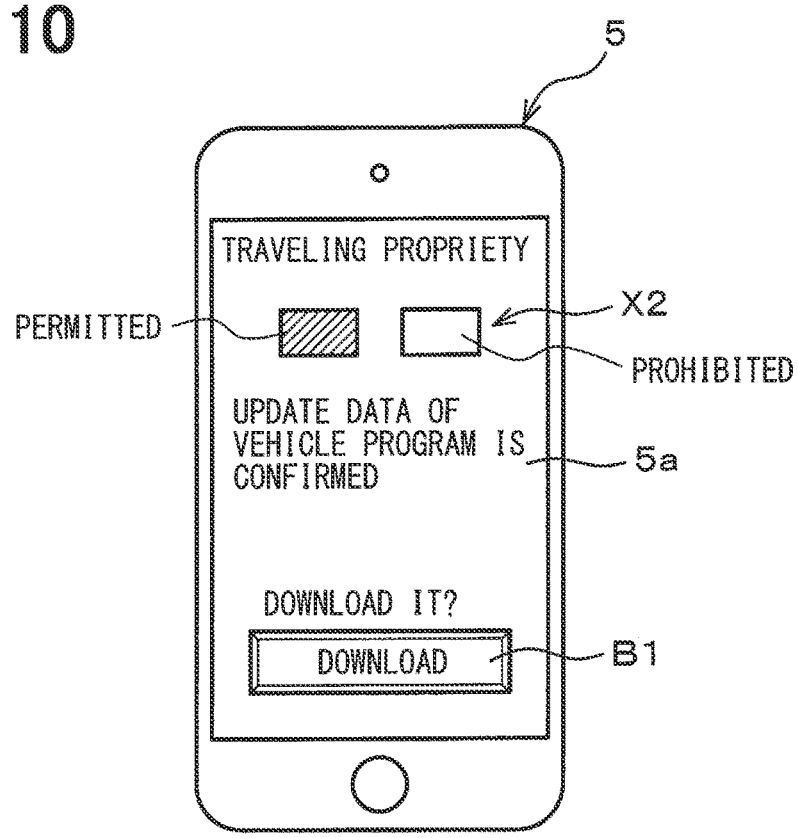
FIG. 10 is Part 1 of display contents by a display.

First, when update files are accumulated in the file server 2 of the center device 4 in step S1 as illustrated in FIG. 8, the file server 2 notifies the web server 3 of event occurrence of reprogramming via the network in step S2 of FIG. 8. When the vehicle user accesses to the web server 3 by operating the mobile terminal 5, notification of event occurrence is received in step S3 of FIG. 8. The mobile terminal 5 may automatically access to the web server 3 to receive notification of event occurrence. In this context, the mobile terminal 5 makes the display 5a display an event content as illustrated in FIG. 10. For example, as illustrated in FIG. 10, the mobile terminal 5 makes the display 5a display that "Update data of vehicle program is confirmed. Download it?" as well as makes the display 5a display a button B1 for download. The vehicle user requests update (download DL) of update file of the program by, for example, pressing the button B1 for download displayed on the display 5a of the mobile terminal 5. The mobile terminal 5 accepts the request via the operation unit 5b on the tach panel. The mobile terminal 5 specifies the update file by requesting download to the gateway device 10 via the web server 3 in step S4 of FIG. 8. Note that, as illustrated in FIG. 10, the mobile terminal 5 may make the display 5a display traveling propriety information X2, and in this case, the traveling propriety information X2 may be displayed as "permitted".

When the update file is specified, the web server 3 commands the gateway device 10 to download the update file via the DCM 21 in step S4. The gateway device 10 determines the download propriety by determining free space or resource in the flash memory 35 or the like. The determination of the download propriety may include not less than any one or all of the conditions that remaining amount of the batter power source +B mounted on the vehicle is sufficiently remaining to be not less than a predetermined amount, for example, the voltage of the battery power source +B is not less than a predetermined voltage, that communication radio wave environment between the DCM 21 and the communication interface 8 or/and 9 is stable, for example, mutual reception electric field intensity level is not less than a predetermined level, and the like.

Then, the gateway device 10 requests the update file to the file server 2 via the DCM 21 in step S5 of FIG. 8 under the condition that download is permitted. This enables the file server 2 to deliver the update file to the gateway device 10 via the DCM 21 in step S6 and enables the gateway device 10 to download the update file in step S6 of FIG. 8.

Figure 11:
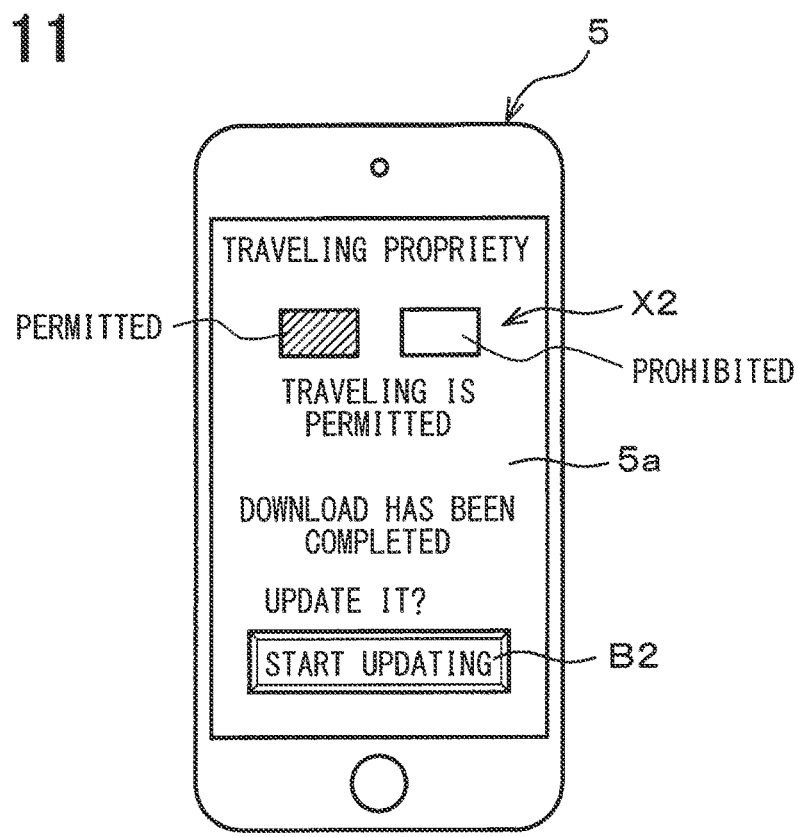
FIG. 11 is Part 2 of display contents by the display.

When completing download of the update file, the gateway device 10 notifies the mobile terminal 5 that download has been completed in step S7a of FIG. 8, and the mobile terminal 5 makes the display 5a display that download has been completed. Alternatively, the gateway device 10 may transmit that download has been completed to the navi ECU 30 as illustrated in step S7b of FIG. 8, and the navi ECU 30 may make the display 46 display that download has been completed. FIG. 11 illustrates a display example of a download completion screen. The mobile terminal 5 makes the screen of the display 5a display traveling propriety information also at this moment. The mobile terminal 5 also makes the download completion screen display an update start button B2 together, and the mobile terminal 5 is to accept a user press instruction by the update start button B2. Upon confirming the download completion screen, the vehicle user instructs start of reprogramming using update file by operating the operation unit 5b of the mobile terminal 5, or operating the operation unit 46b mounted on the display 46. When start of reprogramming is instructed, the user commands the in-vehicle device to be operated (e.g., starting command of engine) depending on, for example, operation of a wireless key or a smart key from outside the vehicle. This makes power source for various operations be applied to the power circuit 39 of the gateway device 10 and the power circuit 49 of each of the ECUs 22 to 31.

When the vehicle use instructs to start updating by making the application stored in the mobile terminal 5 be executed to command execution of reprogramming in step S8a, the command information is transmitted to the web server 3. Then, the web server 3 notifies the gateway device 10 of the command via the DCM 21 in step S8a.

In contrast, when the vehicle user requests the navi ECU 30 to perform updating by operating the operation unit 46b in step S8b, the navi ECU 30 requests execution of reprogramming in step S8b of FIG. 8 by notifying the gateway device 10 of the update request.

The gateway device 10 specifies the ECU (at least one of ECUs 22 to 31) that becomes a reprogramming slave device RS depending on the content of the update file. Then, the gateway device 10 determines a boarding/alighting state in step S9 of FIG. 8, and determines a vehicle state in step S10 of FIG. 8, and when these states satisfy necessary conditions, transmits the update file to the specified reprogramming slave device RS and commands that reprogramming is performed.

Prior to performing the processing or in parallel with performing the processing of steps S9, S10 of FIG. 10, the gateway device 10 may determine traveling propriety by referring to the traveling propriety determination table TA1 for the CAN ID, the connection bus, or the name of the reprogramming slave device RS, and may command the mobile terminal 5 and the navi ECU 30 to issue the information as initial notification in step SA.

Specifically, the gateway device 10 determines that traveling is prohibited when the reprogramming slave device RS is included in the ECUs 26 to 29 connected to the traveling system bus 13. In this case, the gateway device 10 may command the mobile terminal 5 to issue the traveling propriety information X2 indicating that traveling is prohibited as initial notification. Then, when the mobile terminal 5 makes the display 5a display the traveling propriety information X2 indicating that traveling is prohibited, the vehicle user can recognize the traveling propriety information X2 indicating that traveling is prohibited. In this case, the gateway device 10 does not output a reprogramming execution command.

Hereinafter, a determination condition example of steps S9, S10 will be described in detail. The determination conditions in step S9 is to satisfy some or all of the conditions, for example, such as condition A1: that no passenger exists in the vehicle, condition A2: that the voltage of the battery power source +B is not less than the predetermined value, condition A3: that the door lock position is in a lock state, condition A4: that the shift position is at the parking position and the parking brake is in an on state, and condition A5: that the above-mentioned conditions A1 to A4 are satisfied within a predetermined period from the starting timing of reprogramming.

In this context, it is preferable that the gateway device 10 obtains necessary information from the gateway device 10 itself, the ECUs 22 to 31, or the like, to determine that the conditions A1 to A5 are satisfied, or the target ECU among the ECUs 22 to 31 voluntarily determines whether the conditions A1 to A5 are satisfied.

The condition A1 is preferably determined by the above-mentioned boarding determination processing. The condition A2 is preferably determined on the basis of an output result of the detectors 39a, 49b that detect detection value of the voltage of the battery power source +B and/or an output of the power circuits 39, 49. The condition A3 is preferably determined on the basis of, for example, a door lock/unlock state due to a driving of the door lock motor obtained by the door ECU 22. The condition A4 is preferably determined on the basis of, for example, sensor information of the shift lever position sensor obtained from the ECT ECU 28 or the like, and information of a detection sensor of an on/off state of the parking brake obtained from the ECU such as the parking ECU or the brake ECU 27. The condition A5 is preferably determined by the gateway device 10 and another ECU by, for example, measuring a time using a timer and satisfying the conditions A1 to A4 before the measurement time goes through a predetermined time. This makes it possible to determine boarding/alighting state in step S9.

Furthermore, the determination conditions of step S10 are predetermined conditions such as condition A10: that some diagnostic abnormality occurs in the gateway device 10, the DCM 21, or the reprogramming slave device RS, condition A11: that operating temperature of the gateway device 10, the DCM 21, and the reprogramming slave device RS is not high temperature, for example, they are operating in an appropriate operating temperature range, condition A12: that the reprogramming slave device RS or the ECU related to the reprogramming slave device RS is not used, condition A13: that remaining amount of the battery power source +B is sufficient, condition A14: that gasoline remaining amount is sufficient, for example, gasoline remaining amount is not less than a predetermined amount, condition A15: that user confirmation is obtained in the case where remote rewriting is performed in response to an instruction from the vehicle user, A16: that update file that is a target of reprogramming is stored in a intermediate buffer area (corresponding to storage unit) of the gateway device 10, and the like. It is preferable that the gateway device 10 obtain these items of information from the gateway device 10 itself, the DCM 21, the ECUs 22 to 31, and the like to determine each of the conditions A10 to A16, or the target ECU among each of the ECUs 22 to 31 voluntarily determines whether conditions A10 to A16 are satisfied to transmit the result to the gateway device 10, and the gateway device 10 totally determine whether the conditions A10 to A16 are satisfied.

It is desirable that the gateway device 10 obtain diagnostic information indicating the content of abnormality from the DCM 21, all of the ECUs 22 to 31, or the target ECU that becomes the reprogramming slave device RS to determine the condition A10. It is preferable that the condition A11 be determined, for example, on the basis of detection information of the temperature sensor set for the gateway device 10, the DCM 21, and the reprogramming slave device RS. It is preferable that the condition A12 be determined on the basis of operational information of the reprogramming slave device RS and operational information of the ECU related to the operational information. It is preferable that the condition A13 be that, for example, the detection voltage of the battery power source +B detected by the detectors 39a, 49a is not less than a threshold voltage, or that the output voltage of the power circuits 39, 49 is not less than a predetermined value. It is preferable that the condition A14 be determined on the basis of, for example, detection information of the remaining amount sensor for gasoline connected to the meter ECU 23.

It is preferable to determine that the condition A15 be satisfied under the condition that the gateway device 10 commands the display 5a of the mobile terminal 5 to display a massage such as "Is it OK to start program rewriting?" as well as a confirmation button (not shown), the mobile terminal 5 transmits a confirmation completion signal to the gateway device 10 under the condition that a press signal generated when the confirmation button is pressed by the vehicle user is accepted via the operation unit 5b, and the gateway device 10 receives the confirmation completion signal. It is preferable that the condition A16 be determined as being permitted when download DL has been completed without abnormality in step S6 of FIG. 8. This makes it possible to determine the vehicle state.

The gateway device 10 commands the mobile terminal 5 to make the display 5a display the traveling propriety information X2 indicating that traveling is prohibited when the conditions of steps S9 and S10 are not satisfied. Then, the vehicle user can recognize that traveling is prohibited. In this case, the gateway device 10 does not output a reprogramming execution command until the conditions of steps S9 and S10 are satisfied.

When determining that the conditions of steps S9, S10 are satisfied, the gateway device 10 transmits an update file to the reprogramming slave device RS in step S11 of FIG. 8 to command the reprogramming slave device RS to execute reprogramming.

The gateway device 10 may command execution of reprogramming under the condition that the traveling propriety recorded in the traveling propriety table TA1 according to the ECU corresponding to the reprogramming slave device RS indicates that traveling is prohibited, and that the conditions of steps S9, S10 are satisfied. The gateway device 10 may also command execution of reprogramming under the condition that the traveling proprieties recorded in the traveling propriety table TA1 according to all of the ECUs corresponding to the reprogramming slave device RS indicate that traveling is permitted.

When the gateway device 10 transmits the update file to the reprogramming slave device RS to command execution of reprogramming in step S11 of FIG. 8, the reprogramming slave device RS receives the update file and executes reprogramming processing in step S12. The rewriting processing includes entry, erasing processing of old program, writing processing of a new update file, verification processing of the update file written, post processing, and the like.

In this manner, when the gateway device 10 commands execution of reprogramming, in steps SB, SC of FIG. 8, information indicating that reprogramming is ongoing and a stable state keeping request are transmitted to all of the ECUs 22 to 31 including the reprogramming slave device RS and the navi ECU 30. By performing the processing, the gateway device 10 can request maintaining the propriety state of reprogramming, and the state of traveling propriety to all the ECUs 22 to 31 including the reprogramming slave device RS.

The stable state keeping request is a request to each of the ECUs 22 to 31 to make them keep, for example, a state C1: propriety state of reprogramming of each of the ECUs 22 to 31, a state C2: disabled state of power source supply stoppage to each of the ECUs 22 to 31 by holding the state of the ignition power source IG or the accessory power source ACC even when a switch is operated by the user with a key switch (or push button) or a wireless key switch for the engine start/stop, a state C3: door lock state even when a wirelessly operated instruction using a wireless key, a smart key, or the like used for key less entry is received, a state C4: parking state in shift position, or the like. Furthermore, the gateway device 10 changes a subroutine of the own program such that a state C5: in which download is not performed even when a user instruction for download is received is kept.

Upon accepting the stable state keeping request, each of the ECUs 22 to 31 rewrites holding a content of the memory (e.g., the RAM 44, the flash memory 45) or controls a connection load (actuator) to keep the states C1 to C4. To keep the state C1, each of the ECUs 22 to 31 holds data in the memory to set the propriety state of reprogramming to be un-rewritable. To keep the state C2, the body system ECUs 22 to 25 make output stoppage due to relay control of the accessory power source ACC and the ignition power source IG depending on change of switch signal be disabled. Furthermore, to keep the state C, the door ECU 22 keeps the door lock state by holding the state of a door lock motor M1, and to keep the state C4, the ECT ECU 28 keeps the shift position to be in the parking state.

The stable state keeping request is provided for each of the ECU 22 to 31 including the reprogramming slave device RS to stably keep the state in which reprogramming becomes permitted by satisfying the conditions of step S9 and S10. In other words, the stable state keeping request indicates a request provided to stably hold each state inside the vehicle (e.g., power source voltage supply state by the ignition power source IG and the accessory power source ACC, shift position, in-vehicle unmanned state, etc.) also during reprogramming. By performing the stable state keeping request by the gateway device 10, for example, each state of the vehicle, such as forbidding door lock operation, holding the parking brake to be on state, or the like, can be kept, making it possible to stably complete execution of reprogramming processing.

Then, the reprogramming slave device RS starts reprogramming. The reprogramming slave device RS notifies the gateway device 10 of a traveling propriety signal at a timing, for example, to start execution of rewriting processing of the update file. Other ECUs (specifically, the ECUs 26 to 29 connected to the traveling system bus 13) other than the ECU composing the reprogramming slave device RS also transmit a traveling propriety signal to the gateway device 10 in response to, for example, a request from the gateway device 10. In this context, when the gateway device 10 accepts a plurality of traveling propriety signals, when a signal indicating that traveling is prohibited is accepted from any one of the ECUs in step S13, it is preferable that the information that traveling is prohibited be preferentially accepted.

Figure 12A:
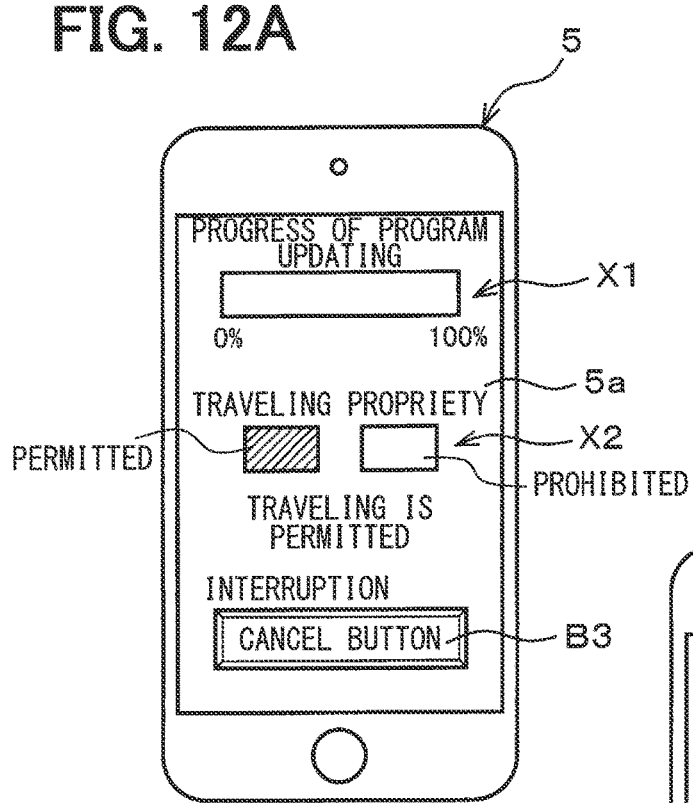
FIG. 12A is Part 3 of display contents by the display.

When determining that traveling is permitted in step S13 of FIG. 8 without accepting such information that traveling is prohibited, the gateway device 10 outputs a traveling permitted notification signal to, for example, the traveling system bus 13. Then, the ECUs 26 to 29 connected to the traveling system bus 13 returns the program processing routine to a traveling permitted state. Furthermore, when determining that traveling is permitted in step S13 of FIG. 8, the gateway device 10 commands to notify that traveling is permitted in step S14 of FIG. 8. In this context, for example, the gateway device 10 notifies the mobile terminal 5 of the user or/and the navi ECU 30 of the traveling permitted notification signal. For example, upon receiving the traveling permitted notification signal, as illustrated in FIG. 12A, the mobile terminal 5 makes the display 5a display progress X1 according to program updating, the traveling propriety information X2, and a cancel button B3. On the display screen of the display 5a, a massage indicating that traveling is permitted is displayed even during program updating.

When accepting the traveling propriety signal indicating that traveling is prohibited from any one of the ECUs in step S13, the gateway device 10 dos not output the traveling permitted notification signal to the traveling system bus 13. In this context, the ECUs 26 to 29 connected to the traveling system bus 13 determine that traveling is prohibited to make traveling control disabled. Also, the gateway device 10 may output a traveling disabled notification signal to the traveling system bus 13. Also in this case, the ECUs 26 to 29 connected to the traveling system bus 13 determine that traveling is prohibited to make traveling control disabled.

Figure 12C:
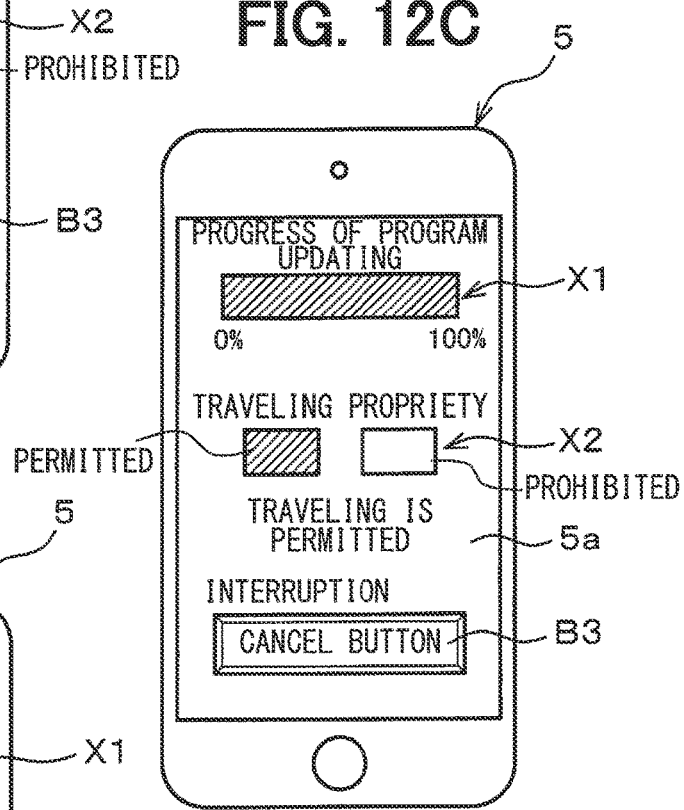
FIG. 12C is Part 5 of display contents by the display.
Figure 12B:
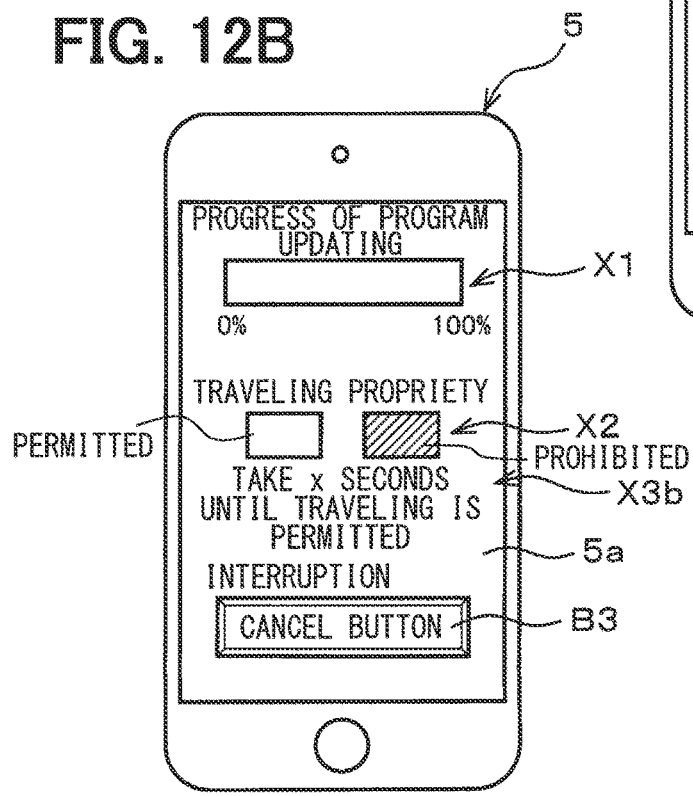
FIG. 12B is Part 4 of display contents by the display.

In this context, the gateway device 10 commands to notify the traveling propriety information X2 indicating that traveling is prohibited in step S15 of FIG. 8. Upon receiving the signal indicating that traveling is prohibited, or when not receiving the signal indicating that traveling is permitted, the mobile terminal 5 makes the display 5a display the traveling propriety information X2 indicating that traveling is prohibited as illustrated in FIG. 12B. In this context, it is desirable that, for example, remaining time information X3b indicating that how many seconds does it take to become a traveling permitted state be made to be displayed on the display 5a of the mobile terminal 5, in addition to the traveling propriety information X2.

Then, when the reprogramming slave device RS completes execution of reprogramming processing, information indicating that the execution has been completed is notified to the gateway device 10, and the gateway device 10 notifies the mobile terminal 5 of reprogramming completion information. Then, as illustrated in FIG. 12C, the mobile terminal 5 makes the traveling propriety information X2 as being permitted and displays that traveling is permitted after reprogramming has been completed for demonstrating to the vehicle user.

Figure 9:
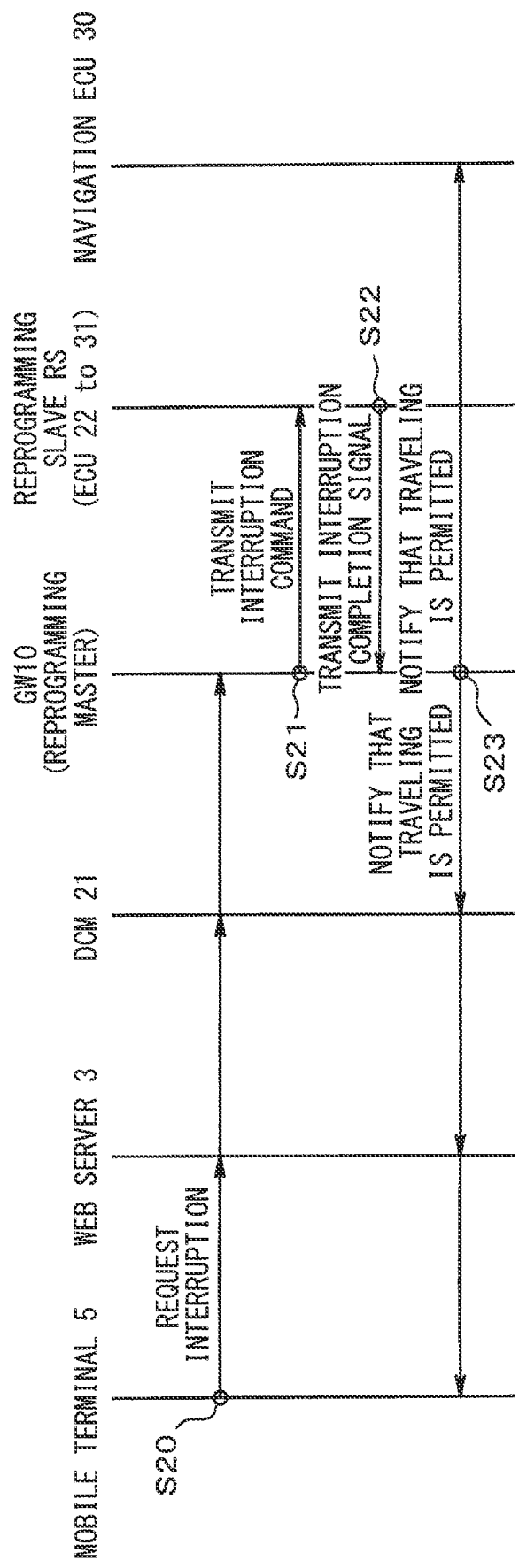
FIG. 9 is a sequence diagram illustrating an interruption operation.

FIG. 9 illustrates a sequence diagram in the case where interruption is requested. Here, an example is illustrated in which the vehicle user operates the mobile terminal 5 and presses the cancel button B3 to request interruption. When the vehicle user requests interruption by operating the mobile terminal 5 and pressing the cancel button B3 in step S20 of FIG. 9, the interruption request is applied to the gateway device 10 via the web server 3 and the DCM 21. Upon receiving the interruption request, the gateway device 10 requests interruption by transmitting an interruption command to the reprogramming slave device RS in step S21 of FIG. 9. In this context, the reprogramming slave device RS stops the program update processing in the state where it does not affect traveling, or makes the program update processing be in initial state to return to the traveling permitted state for interrupting rewriting.

Figure 13:
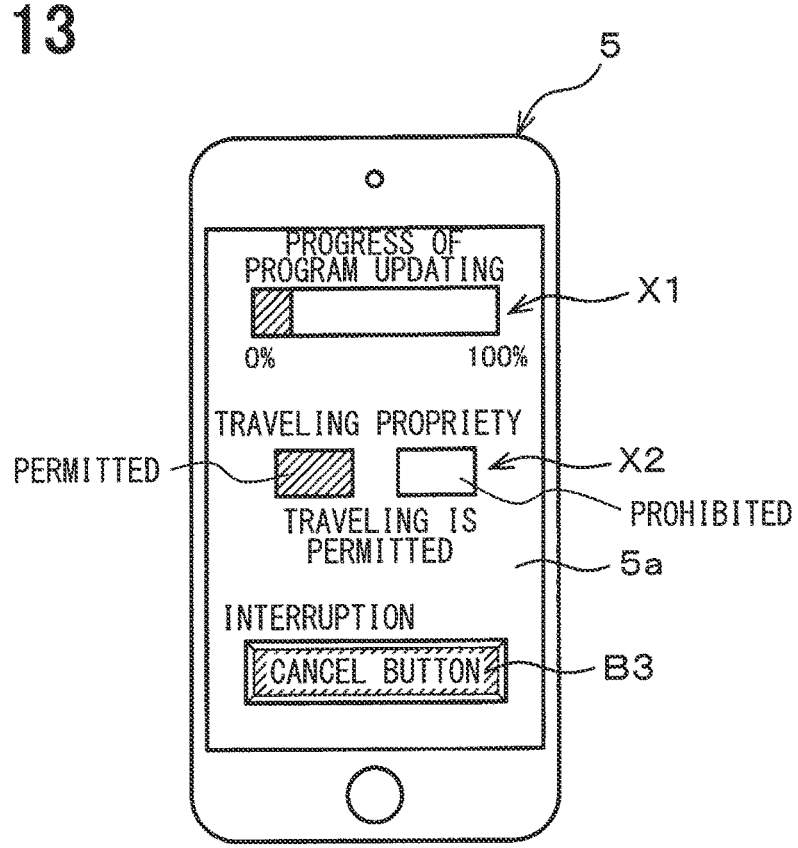
FIG. 13 is Part 6 of display contents by the display.

Furthermore, upon receiving an interruption completion signal indicating that interruption has been completed from the reprogramming slave device in step S22 of FIG. 9 after accepting the interruption request, the gateway device 10 transmits the traveling permitted notification signal to the mobile terminal 5 via the DCM 21 and the web server 3 or transmits the traveling permitted notification signal to the navi ECU 30 as the traveling propriety signal in step S23 of FIG. 9. Upon receiving the traveling permitted notification signal, the mobile terminal 5 makes the display 5a of the mobile terminal 5 display the traveling propriety information X2 indicating that traveling is permitted as illustrated in FIG. 13. This allows the vehicle user to determine that traveling is permitted. Furthermore, the gateway device 10 transmits the traveling permitted notification signal to the traveling system bus 13. This allows the ECUs 26 to 29 connected to the traveling system bus 13 to determine that traveling is permitted, and processing is returned to a vehicle travelable processing routine.

In the above-mentioned example, although the example is illustrated in which the mobile terminal 5 requests interruption via the web server 3, when interruption is requested in the vehicle, another ECU (e.g., navi ECU 30) transmits an interruption request to the gateway device 10. This interrupts the processing.

SUMMARY

According to the embodiment, the gateway device 10 commands the mobile terminal 5 to display the traveling propriety information X2, making it possible to adequately notify the vehicle user of traveling propriety by the display 5a. This enables the vehicle user to confirm traveling propriety, making it possible to immediately determine driving propriety. For example, when the system 1 is executing a part of reprogramming that does not directly affect traveling, it can be notified that driving is permitted, allowing the vehicle user to promptly perform driving even a little.

Furthermore, for example, when the vehicle user determines that it is urgent, the gateway device 10 accepts an interruption request by pressing the cancel button B3 by the user. In this context, upon accepting the interruption request, the gateway device 10 requests interruption of rewriting processing of the update file by transmitting an interruption command. In this context, also in the case of urgency, the reprogramming slave device RS stops the program update processing in the state where it does not affect traveling, or makes the program update processing be in initial state to return to traveling permitted state for interrupting rewriting. Then, the gateway device 10 commands the mobile terminal 5 to display that traveling is permitted after completion of interruption. This eliminates false operation by the vehicle user even during reprogramming, enabling the vehicle user to drive to travel in a safe state even in the case of remote rewriting. Note that, the gateway device 10 may transmit an interruption command when interruption of rewriting is needed by determining operation of the mobile terminal 5 performed by the vehicle user.

The gateway device 10 refers to the traveling propriety determination table TA1 for CAN ID, connection bus, or name of the reprogramming slave device RS to determine traveling propriety. When the gateway device 10 commands the mobile terminal 5 to display the traveling propriety information, the display 5a displays the traveling propriety information X2, enabling the vehicle user to immediately confirm the traveling propriety information X2.

When the gateway device 10 commands the reprogramming slave device RS to execute reprogramming under the condition that traveling propriety of the ECU corresponding to the reprogramming slave device RS stored in the traveling propriety determination table TA1 is determined as being permitted in traveling, reprogramming processing can be immediately performed without waiting.

When receiving the traveling propriety signal from the reprogramming slave device RS or another ECU other than the ECU composing the reprogramming slave device RS, the gateway device 10 commands the mobile terminal 5 or the like to display the traveling propriety information X2 according to the traveling propriety signal. This enables the vehicle user to confirm the traveling propriety information X2.

Figure 14:
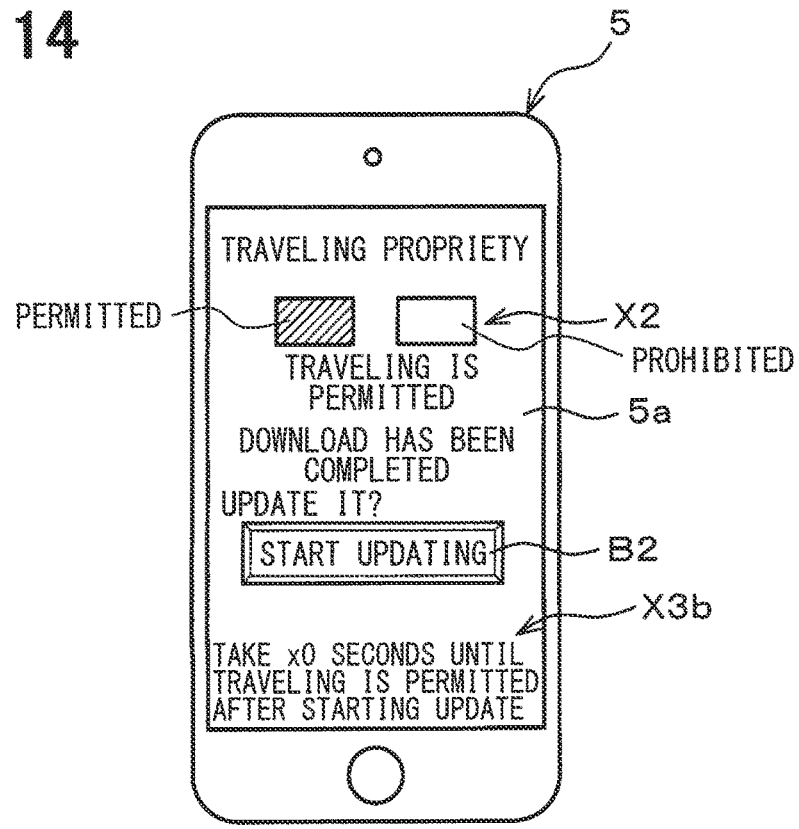
FIG. 14 is Part 7 of display contents by the display.

FIG. 14 illustrates a modification of a display screen alternative to that of FIG. 11, and for example, waiting time after starting update may be displayed before starting reprogramming. That is, as illustrated in FIG. 14, the mobile terminal 5 may make the display 5a of the mobile terminal 5 display the remaining time information X3b that is "after starting updating, waiting for x0 seconds is needed to travel" in response to display command by the gateway device 10.

Modifications

Hereinafter, a case will be described in which start of reprogramming is instructed in a state where a user is boarding on a vehicle. In the above description, although the mode is illustrated in which the user starts engine from outside the vehicle to instruct reprogramming, the same applies to the case where the user operates the key switch (or the push button) to start engine in the state where the user is boarding.

For example, any of the conditions A1 to A5 of boarding/alighting state determined in step S9 of FIG. 8 is sufficient to be provided as needed, but a vehicle exists, for example, that is not equipped with a seating sensor, an intrusion sensor. Accordingly, a case will be considered where condition A1 is excluded.

In such a case, determination condition of the boarding/alighting state of step S9 of FIG. 8 is established when the conditions A2 to A5 are satisfied, so that even when the user is boarding on the vehicle, the condition of the boarding/alighting state of step S9 is satisfied as long as, for example, door the lock condition A3 is satisfied by making door lock be in lock state, the condition A4 is satisfied by making the shift lever or the parking brake be held at the above-mentioned predetermined state, and the vehicle power source condition A2 and the time condition A5 are satisfied.

It is supposed that the user instructs reprogramming by operating the display unit 46b of the display 46 after engine is started in response to operation of a key switch and a push button in the vehicle. To start reprogramming, satisfying steps S9, S10 of FIG. 8 is needed, so that condition of step S9 is established by, for example, operating vehicle equipment (e.g., shift lever, door lock, parking brake) to intentionally satisfy the conditions A3, A4, etc. in step S9 by the user. In this case, in step S11 of FIG. 8, a command to execute reprogramming is output to the reprogramming slave device RS in step S11 of FIG. 8. Because user is boarding, it is also supposed that the vehicle state is changed to make reprogramming be failed when the user performs various operation to the vehicle equipment after the output.

When such a case is considered, it is specifically desirable that the gateway device 10 perform processing of outputting a request for holding stable state to the reprogramming slave device RS or another ECU in step SB, SC of FIG. 8. This enables each of the ECUs 22 to 31 to stably hold the vehicles state, and prevents false operation of a vehicle operation unit (operation unit 46b, key switch or push switch, shift lever, handle, accelerator, etc.), vehicle improper start based on the false operation, reprogramming processing failure, escapement of the user to the outside of the vehicle, and the like, especially by the user.

Likewise, any of the determination conditions A10 to A16 of step S10 may be provided as needed. Furthermore, the same applies to the case where the situation of program update processing is made to be displayed on the display screen of the display 46 that becomes a vehicle display device.

Second Embodiment

FIG. 15 to FIG. 19 illustrate additional explanatory drawings of a second embodiment. The embodiment has progress display command processing and progress determination processing as its characteristics, so that the progress display command processing and the progress determination processing will be described. As illustrated in the first embodiment, upon receiving update file, the reprogramming slave device RS executes reprogramming processing.

The progress display command processing and the progress determination processing according to the embodiment is processing performed by the gateway device 10 that becomes the reprogramming master device RM, and is processing performed in parallel also during reprogramming processing performed by the above-mentioned reprogramming slave device RS.

Also in the embodiment, a mode will be described in which the gateway device 10 functions as the reprogramming master device RM. The mobile terminal 5 according to the embodiment has a GPS receiver for receiving a GPS signal mounted thereon, and includes a position specifying function for specifying position on the basis of the GPS receiver.

Figure 15:
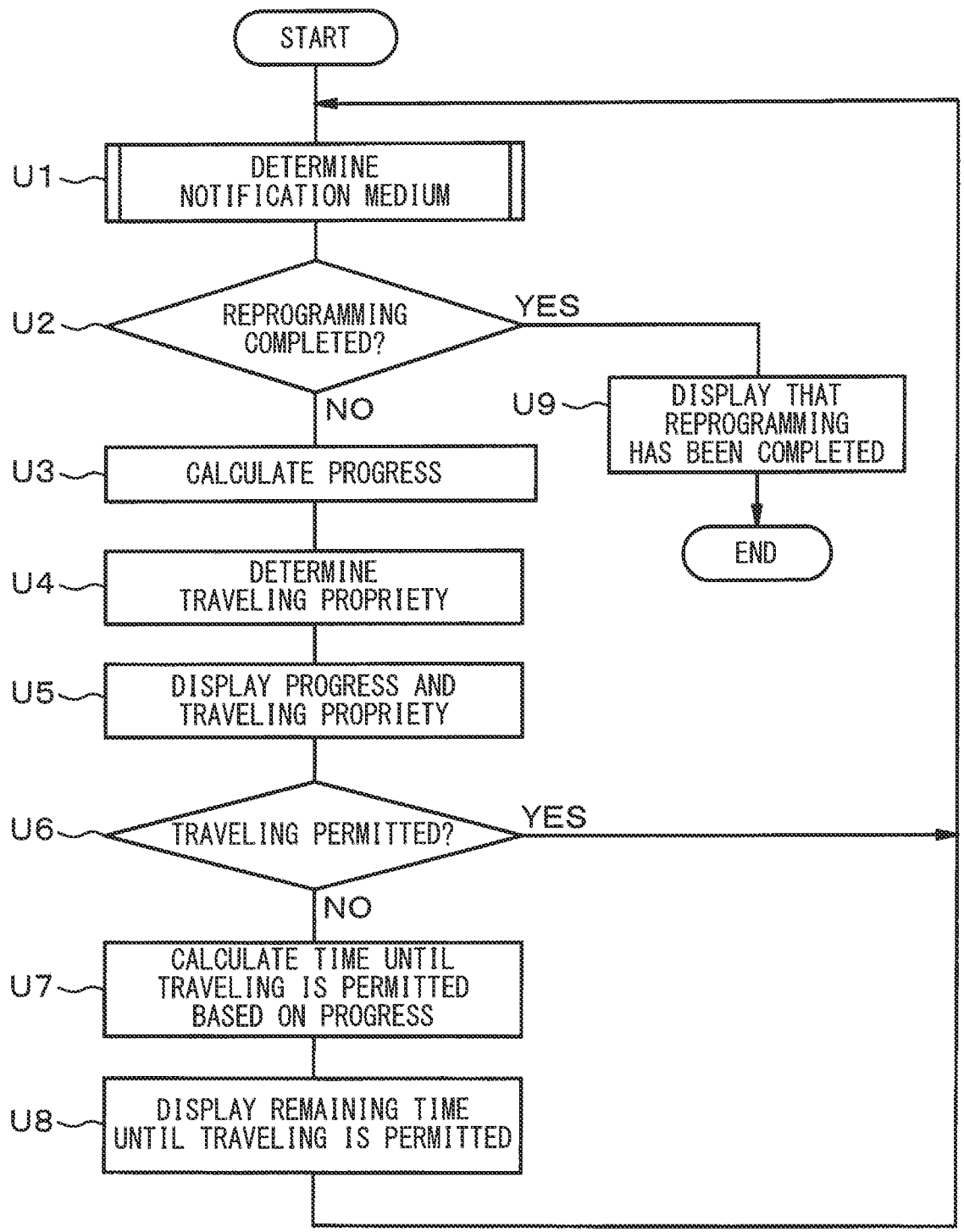
FIG. 15 is a flowchart illustrating processing contents by a reprogramming master device in a second embodiment.
Figure 16:
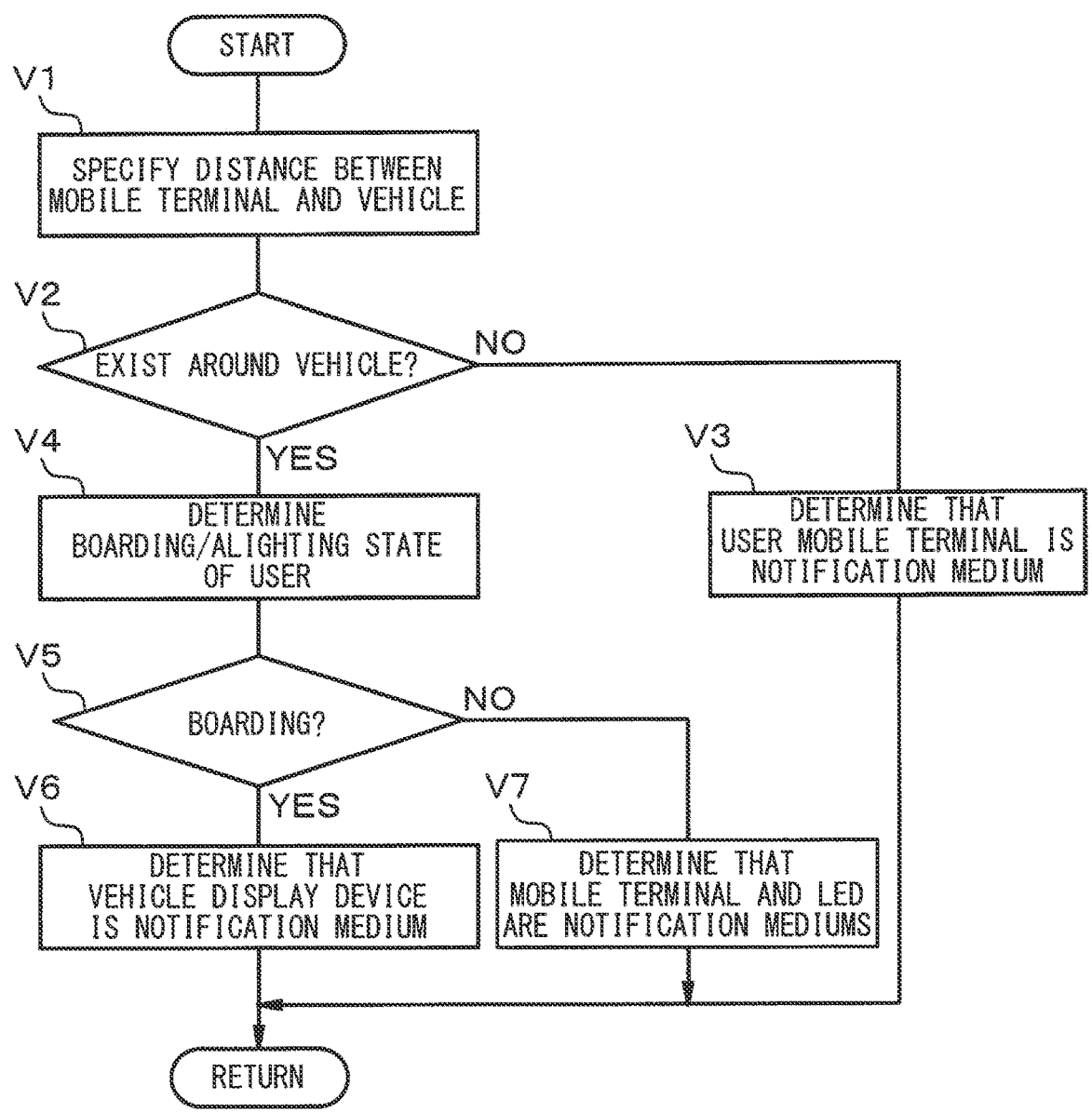
FIG. 16 is a flowchart illustrating a flow of a determining method of a notification medium.

First, as illustrated in U1 of FIG. 15, the gateway device 10 determines a notification medium. The notification medium denotes various display mediums, for example, such as the display 46 connected to the various ECUs, the mobile terminal 5, a display, for example, such as the LED 38 mounted on, for example, the gateway device 10, and the like. FIG. 16 illustrate a flow of a determination method of the notification medium using a flowchart.

As illustrated in FIG. 16, the gateway device 10 specifies a distance between the vehicle and the mobile terminal 5 in step V1. For example, the gateway device 10 receives a present location by the position specifying function of the mobile terminal 5, compares the present location with a present location specified by the navi ECU 30, and determines whether the mobile terminal 5 exists around the vehicle. Furthermore, for example, whether communication is established by short-range wireless technology (e.g., communicable range of about 10 to 100 m) may be used as a basis for determination, and for example, when Bluetooth technology is used, whether pairing has been done may be determined to determine whether the mobile terminal 5 exists around the vehicle on the basis of the determination result.

Then, when determining that the mobile terminal 5 does not exist around the vehicle, the gateway device 10 makes determination as being NO in step V2, and determines that the notification medium is the mobile terminal 5 owned by the user as in step V3. In contrast, upon determining that the mobile terminal 5 exists around the vehicle, the gateway device 10 makes affirmative determination as being YES in step V2, and the gateway device 10 specifies whether the user is boarding or alighting in step V4. For example, in this context, it is preferable that the gateway device 10 make determination using a seating sensor or an intrusion sensor preliminarily set in the vehicle as illustrated in the above-mentioned embodiment.

When determining that the driver is boarding in step V5, the gateway device 10 determines that the notification medium is the vehicle display device in step V6. The vehicle display device denotes the display 46, and is a display such as CID, HUD, an instrument panel, or the like installed at a position capable of being directly viewed from inside the vehicle determined as the driver existing therein. Accordingly, when the driver is boarding, information displayed on the display screen of the vehicle display device can be immediately confirmed.

In contrast, when determining that the driver is not boarding in step V5, the gateway device 10 determines that the mobile terminal 5 of the user and the LED 38 are notification mediums in step V7. In this context, when the gateway device 10 determines that, for example, the LED 38 is the notification medium in step V7, it is preferable that the gateway device 10 lengthens a flashing cycle when the progress X1 is close to 0%, and gradually shortens the flashing cycle when the progress X1 is close to 100%. Alternatively, the color of the LED 38 may be changed. Thus, even when the driver is not boarding, the vehicle user and the like can immediately confirm information by confirming the lighting/flashing state of the display 5a of the mobile terminal 5 or the LED 38.

Figure 17A:
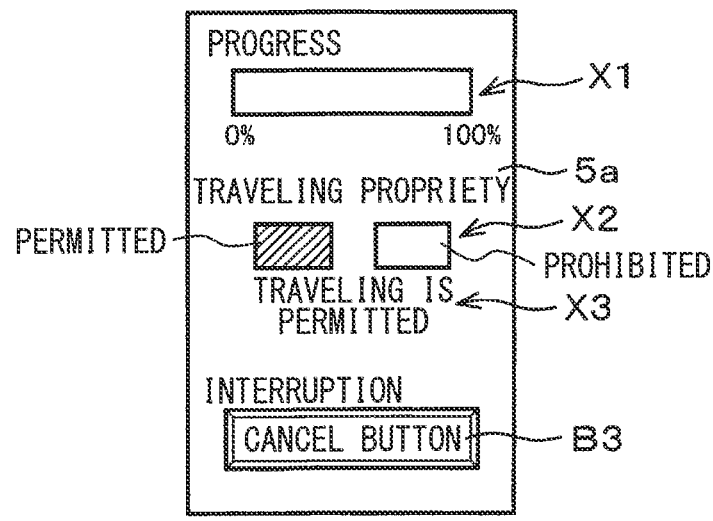
FIG. 17A is Part 8 of display contents by the display.

For example, when determining to make the mobile terminal 5 display information, the gateway device 10 commands the mobile terminal 5 to display the contents illustrated in FIG. 17A. Here, like the first embodiment, the mobile terminal 5 makes the display 5a display progress X1, traveling propriety information X2, and the cancel button B3 as illustrated in FIG. 17A. In the initial state, the progress X1 indicates 0%, the traveling propriety information X2 indicates that traveling is permitted, and the cancel button B3 is displayed to accept interruption of updating.

After the notification medium is determined by the gateway device 10, the flow returns to the processing of FIG. 15, and whether reprogramming is in the middle of progress or has been completed is determined in step U2. When the gateway device 10 performs a series of processing illustrated in FIG. 15, FIG. 16, the processing illustrated in the first embodiment is performed in parallel, and when reprogramming is in the middle of progress, the gateway device 10 calculates progress in step U3.

As the entire sequence, the gateway device 10 can grasp a transmission completion update file by transmitting update file to the reprogramming slave device RS and receiving a reply signal from the reprogramming slave device RS.

A method complying with a vehicle diagnostic communication specification will be described. The gateway device 10 divides the update file during reprogramming into messages in comply with a standard such as unified diagnostic services (UDS) regulated by ISO14229 that is a diagnostic communication specification of the ECU of a passenger vehicle to transmit them to the reprogramming slave device RS. In this context, the gateway device 10 transmits a service ID (SID 34) indicating start of data transfer to the reprogramming slave device RS, and then transmits data with a service ID (SID 36) indicating transfer of real data by a plurality of times, and transmits a service ID (SID 37) indicating finish of data transfer.

This enables the microcomputer 36 of the gateway device 10 to determine the progress depending on an amount of transmission data transmitted to the reprogramming slave device RS. As a concrete example, it is preferable that the microcomputer 36 of the gateway device 10 divide the entire amount of rewritten data amount of the update file by the transmission data amount transmitted to the reprogramming slave device RS to calculate progress rate as the progress.

In this context, the progress may be determined depending on how many percent the number of repetitions of the SID 36 indicating real data transfer has advanced with respect to the total number, or the number of repetitions of transmission of the series of service IDs (SID 34, SID 36, SID 37) may be counted to determine the progress depending on the number of repetitions of the transmission. In such a case, while the gateway device 10 transmits the update file while dividing it into every unit block (sector) such as 256 byte or 1 Kbyte with respect to a storage area of, for example, 1 Mbyte of a memory for storing the update file of each of the ECUs 22 to 31, the progress may be determined depending on how many blocks as units has been transmitted with respect to the whole blocks as to the transmission data amount. That is, the progress may be determined using a block (=sector) as unit.

Alternatively, the progress may be determined by determining how many percent the number of update files subjected to transmission processing to the reprogramming slave device RS becomes with respect to the whole number of update files, that is, using the number of update files as a unit. Alternatively, for example, when some ECUs among all of the ECUs 22 to 31 is a target as the reprogramming slave device RS, the gateway device 10 may determine the progress by determining that update file is being transmitted to what number of ECU as a target. That is, the progress may be determined depending on the number of transmission completion to ECUs.

Also, although the ECUs 22 to 31 that become the reprogramming slave devices RS each are mainly composed by the microcomputer 41 illustrated in FIG. 3, there is a case in that the microcomputer 41 is composed of a main microcomputer and a sub microcomputer, which are plural in total. In such a case, there is a case in that the update file is reprogrammed for each of the main microcomputer and the sub microcomputer, and in such a case, each of the main microcomputer and the sub microcomputer may be regarded as one microcomputer to determine the progress depending on how many percent of the microcomputers the update files to be stored therein have been transmitted to, with respect to the number of the main microcomputer and the sub microcomputer that become total targets of updating.

Furthermore, a rewriting completion expected time may be calculated depending on the data amount of the update file to determine the progress using a time from start of rewriting with respect to the calculated rewriting completion expected time. The methods of determining the progress may be used in combination. This enables to obtain more detailed progress X1 to be obtained, making it possible to display the progress on the display 5a, 46, or the like with more fine display granularity in percentage.

Then, the gateway device 10 determines traveling propriety in step U4 after the progress is determined in this manner. The gateway device 10 refers to the traveling propriety determination table TA1 for relation information such as the CAN ID, the connection bus, or the name of the reprogramming slave device RS in step U4 to readout traveling propriety for determination, and commands the mobile terminal 5 for display, after the determination processing, to make the display 5a of the mobile terminal 5 display the traveling propriety information X2 with the progress X1 in step U5 as illustrated in FIG. 17B.

When the traveling propriety determined in step U4 indicates that traveling is prohibited, the gateway device 10 calculates a time until traveling is permitted on the basis of the above-mentioned progress in step U7, and making the display 5a display a remaining time until traveling is permitted in step U8. The remaining time is calculated on the basis of a remaining processing amount obtained by subtracting a processing amount (e.g., the transmission data amount, the reception data amount, the number of update files, the number of blocks, the rate of the number of ECUs, etc., which are mentioned above) from the whole processing amount.

Figure 17B:
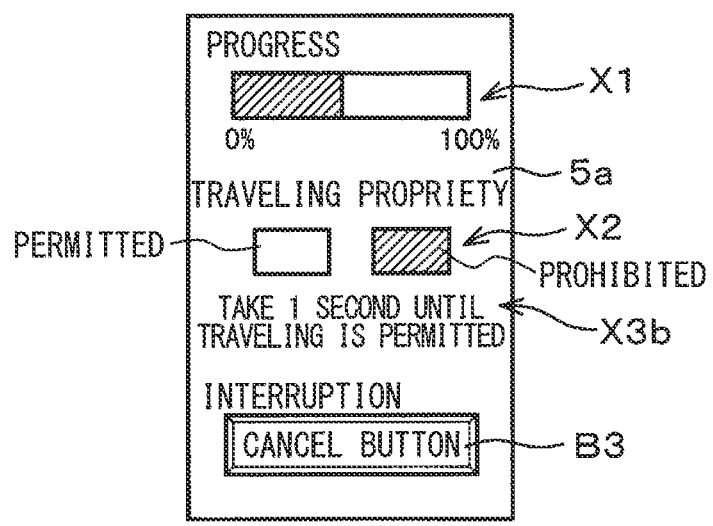
FIG. 17B is Part 9 of display contents by the display.

In this context, for example, when traveling is prohibited, like a screen display image illustrated in FIG. 17B, the gateway device 10 makes the display 5a display the remaining time information X3b indicating a time until traveling is permitted with the above-mentioned progress X1 and traveling propriety information X2. Then, when the reprogramming is completed, the reprogramming slave device RS notifies the gateway device 10 of the completion, so that the gateway device 10 notifies the mobile terminal 5 of the completion. The mobile terminal 5 thus makes the display 5a display that reprogramming has been completed to finish its processing.

Also, as illustrated in FIGS. 17A, 17B, it is preferable to make the display screen of the display 5a display the cancel button B3 for interruption forced by the user. When the user presses the cancel button B3, the microcomputer 50 of the mobile terminal 5 accepts the request. Then, the mobile terminal 5 transmits the request to the gateway device 10. This makes the gateway device 10 interrupt the transmission processing of the update file for reprogramming.

For example, it is preferable that the gateway device 10 make the cancel button B3 be in a disabling state when determining that interruption of reprogramming is prohibited when, for example, the ECUs 26 to 29 connected to the traveling system bus 13 are being reprogrammed, and makes the cancel button B3 be in an enabling state when determining that interruption is permitted.

Figure 18:
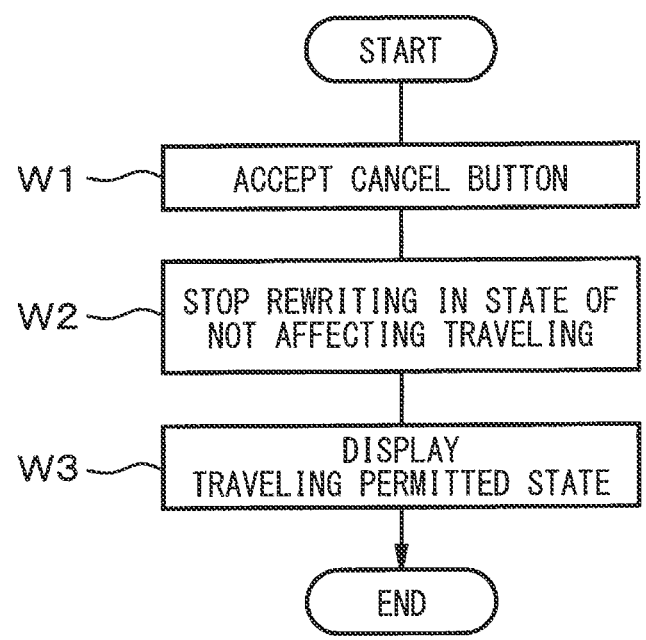
FIG. 18 is a flowchart illustrating processing during interruption.

FIG. 18 illustrates a flow of processing contents of the gateway device 10 and the mobile terminal 5 during interruption. When the mobile terminal 5 accepts an input from the cancel button B3, press information by the cancel button B3 is notified to the gateway device 10 via the DCM 21 from the mobile terminal 5. The gateway device 10 stops rewriting in the state where it does not affect traveling in step W2. That is, the reprogramming slave device RS transmits the traveling propriety information as illustrated in the above-mentioned embodiment, and the gateway device 10 receives the traveling propriety information, waits until the traveling propriety information indicates that traveling is permitted, and then, stops rewriting processing at a timing when traveling is permitted.

Figure 17C:
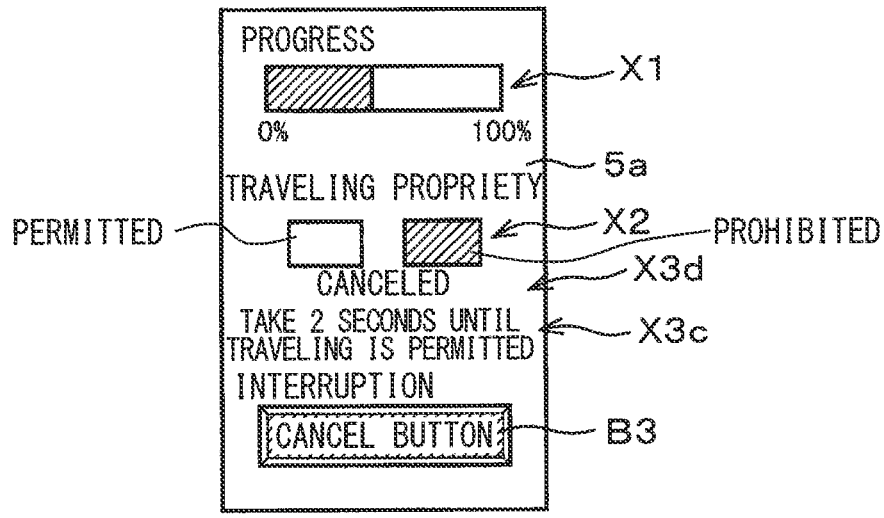
FIG. 17C is Part 10 of display contents by display.
Figure 17D:
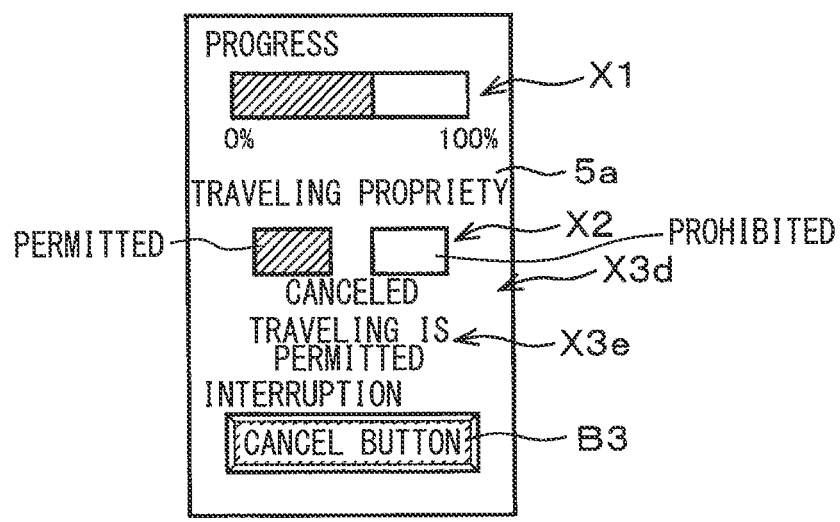
FIG. 17D is Part 11 of display contents by display.

The CPU 32 of the gateway device 10 stores the rewriting stop information in a storage medium such as the flash memory 35. In this case, the gateway device 10 calculates a time until a timing at which safe driving becomes permitted even when rewriting processing of the update file is stopped in the midway, or a timing to stop reprogramming processing to return to the program before rewriting as a time that nearly does not affect traveling, and notifies the mobile terminal 5 of the time. Then, as illustrated in FIG. 17C, the mobile terminal 5 makes the display 5a display the time information X3c notified together with a reception message 3d by the cancel button B3 such as "cancelled".

The mobile terminal 5 counts the time information X3c calculated using a timer or the like, and when the time has passed, makes display of the traveling propriety information X2 change from "prohibited" to "permitted" as well as makes the display 5a display a traveling permitting message X3e such as "traveling is permitted". See FIG. 17D.

It is desirable that the timing at which the mobile terminal 5 makes the display screen of the display 5a display the traveling permitting message X3e is after the gateway device 10 accepts a traveling propriety signal indicating that traveling is permitted from the reprogramming slave device RS or other ECUs (e.g., the ECUs 26 to 29 connected to the traveling system bus 13). That is, it is desirable that the gateway device 10 determine traveling propriety on the basis of the traveling propriety information accepted from the reprogramming slave device RS after the time information X3c is notified to the mobile terminal 5, and notify, at a timing when the traveling propriety information indicates that traveling is permitted, the mobile terminal 5 that traveling is permitted, and then, the mobile terminal 5 make the display 5a display the traveling permitting message X3e. This enables the user to understand that traveling is permitted, and start driving the vehicle safely.

Then, after the user drives the vehicle and stops the engine as usual, the gateway device 10 plays a main role of starting reprogramming processing. For example, when referring to the flash memory 35 to confirm that the rewriting stop information is stored when the engine is restarted, the gateway device 10 starts reprogramming processing.

Figure 17E:
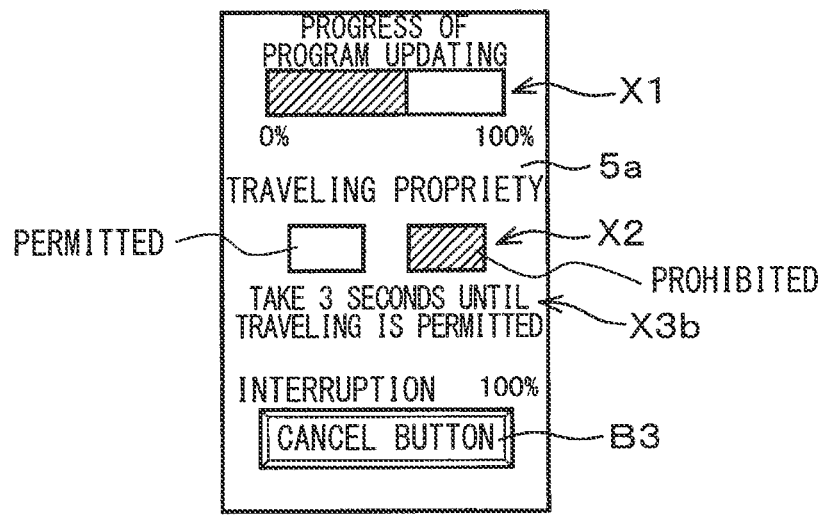
FIG. 17E is Part 12 of display contents by display.
Figure 17F:
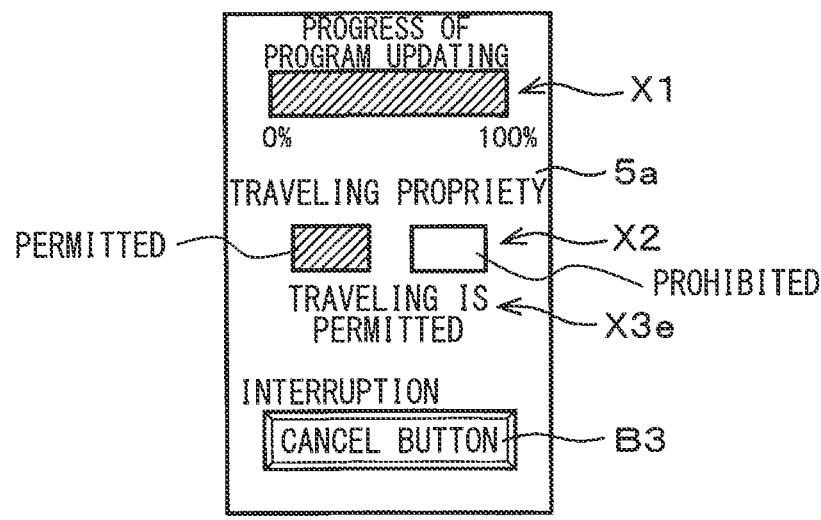
FIG. 17F is Part 13 of display contents by display.

Like the above description, the gateway device 10 calculates a time until traveling becomes permitted, and notifies the mobile terminal 5 of the remaining time information X3b indicating the time until traveling becomes permitted via the DCM 21. Then, the mobile terminal 5 switches the traveling propriety information X2 from "permitted" to "prohibited" to makes the display 5a display it as well as makes the display 5a display the remaining time information X3b as illustrated in FIG. 17E.

Then, upon accepting that reprogramming has been completed from the reprogramming slave device RS, the gateway device 10 clears the rewriting stop information stored in the flash memory 35 as well as notifies the mobile terminal 5 of the completion information, and the mobile terminal 5 makes the progress X1 be displayed as 100% as well as makes the traveling propriety information X2 to be "permitted" from "prohibited" to notify the user that traveling is permitted. See FIG. 17F. This enables the user to recognize that reprogramming has been completed as well as understand that safely traveling the vehicles is permitted, making it possible to start driving.

According to the embodiment, since the mobile terminal 5 makes display 5a display the traveling propriety information X2 by being commanded from the gateway device 10 for display, the vehicle user can be adequately notified of traveling propriety. The user can determine whether driving is permitted, making it possible to secure safety.

Furthermore, since the mobile terminal 5 makes the display 5a display the progress X1 by being commanded from the gateway device 10 for display, the vehicle user can be adequately notified of the progress X1. When the progress is notified via a notification medium, the vehicle user can roughly grasp the time until completion of program updating. Accordingly, the vehicle user can determine whether program is being updated, making it possible to prevent accidentally starting to drive as far as possible. This enables to ensure safety.

For example, even when the vehicle user can grasp the progress X1, when display granularity is rough because of two step display such as during reprogramming or finish of reprogramming, the vehicle user can grasp only whether reprogramming has been completed. In such a case, there is a risk that the user mistakenly determines that reprogramming has been missed when reprogramming time is long.

In the embodiment, the gateway device 10 determines the progress depending on the transmission data amount transmitted to the reprogramming slave device RS, determines the progress depending on the number of transmission completions to the ECU, determines the progress depending on the number of update files subjected to transmission progressing, or determines the progress by calculating a rewriting completion expected time and using a time from start of rewriting with respect to the rewriting completion expected time. Accordingly, in response to a display command by the gateway device 10, the mobile terminal 5 can make the granularity of progress display precise as far as possible like percentage display to notify that progress is being normally advanced. Accordingly, the user can wait for reprogramming completion in relief.

Furthermore, since the gateway device 10 commands the mobile terminal 5 to make the display 5a display the remaining time information X3b, the user can accurately determine how long waiting allows to drive the vehicle. The user can effectively use latency.

Furthermore, the mobile terminal 5 is configured to make the display 5a display the chancel button B3 to accept pressing of the cancel button B3, enabling the user to instruct interruption at a desirable timing.

Furthermore, even when the cancel button B3 is pressed by the user to be accepted, the gateway device 10 and the reprogramming slave device RS continues reprogramming without stopping it until it becomes the state that does not affect the traveling and it is determined that traveling is permitted, so that the user can drive under a state of program rewriting that does not nearly affect vehicle traveling, enabling safe driving.

Figure 19:
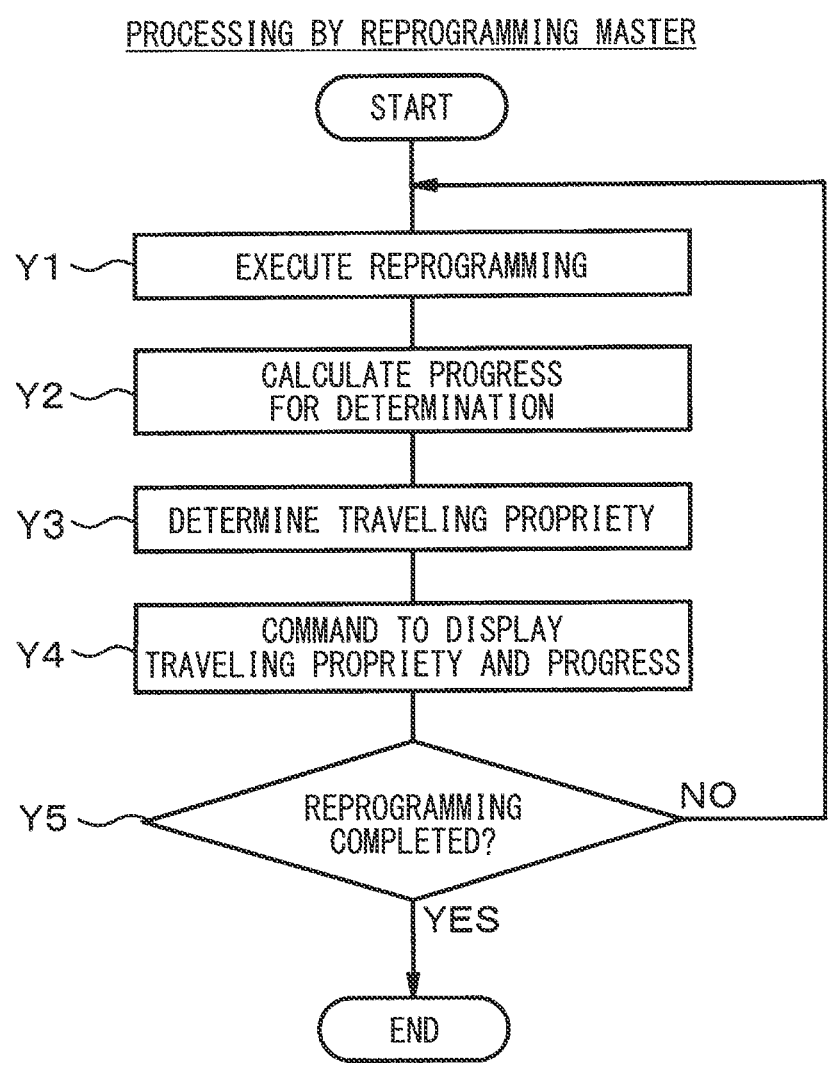
FIG. 19 is a flowchart illustrating processing contents by the reprogramming master device.

FIG. 19 collectively illustrates processing contents by the gateway device 10 that becomes the reprogramming master device RM according to the embodiment. Upon accepting a reprogramming instruction from outside, the gateway device 10 performs reprogramming in step Y1, and then calculates the progress X1 for determination in step Y2.

Then, the gateway device 10 determines traveling propriety in step Y3, and commands the preliminarily set display (e.g., the display 5a, the LED 38) to display the traveling propriety information X2 and the progress X1 in step Y4. By offering the progress X1 to the user, the user can grasp the detailed progress X1, which eliminates false operation during rewriting, enabling safe rewriting even when remote rewriting command is made.

Then, the gateway device 10 repeats the processing from step Y1 until reprogramming is completed. Although it is desirable to determine that reprogramming has been completed at the timing when the reprogramming completion information is accepted from the reprogramming slave device RS to regard it as completion in determination method of reprogramming completion, determination may be made by regarding the timing when a predetermined time has passed from the time of completion of transmission of the update file to the reprogramming slave device RS as reprogramming completion. In the embodiment, the gateway device 10 mainly determines progress and traveling propriety to command the display (e.g., 5a) to perform display in this manner. According to such an embodiment, the gateway device 10 can totally control information.

Third Embodiment

Figure 20:
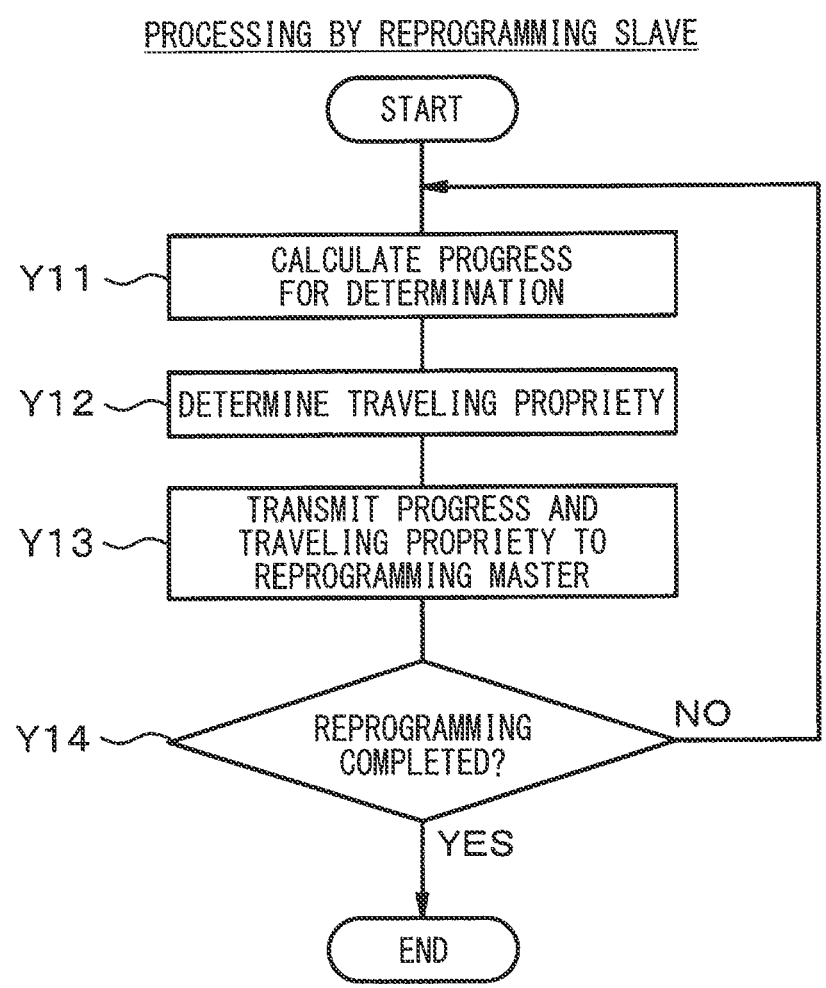
FIG. 20 is a flowchart illustrating processing contents by a reprogramming slave device in a third embodiment.
Figure 21:
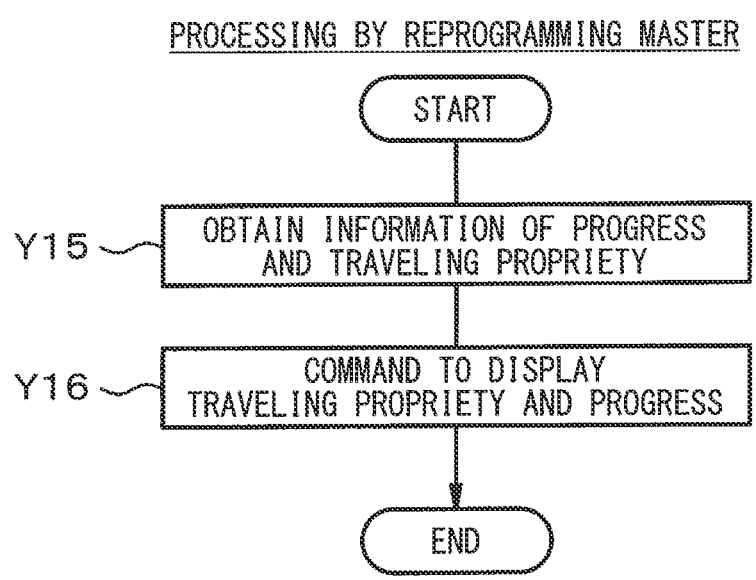
FIG. 21 is a flowchart illustrating processing contents of the reprogramming master device.

FIG. 20 and FIG. 21 illustrate additional explanatory drawings of a third embodiment. FIG. 20 and FIG. 21 illustrate processing contents of the gateway device 10 that becomes the reprogramming master device RM and the reprogramming slave device RS according to the embodiment, using a flow chart. As illustrated in FIG. 20 and FIG. 21, the processing contents of the gateway device 10 that becomes the reprogramming master device RM illustrated in FIG. 19 may be shared with the reprogramming slave device RS.

As illustrated in FIG. 20, the progress is calculated for determination in step T1, the traveling propriety is determined in step T2, and information of the progress and the traveling propriety is transmitted to the reprogramming master device RM in step T3, which are mainly performed by the reprogramming slave device RS. In the step T2, it is preferable that the reprogramming slave device RS determine the progress depending on a reception data amount of the update file received from the gateway device 10. As a concrete example, the reprogramming slave device RS may divide the received reception data amount by the total data amount of the update file preliminarily received from the gateway device 10 to calculate a progress rate to determine the progress. In this context, the progress may be determined depending on how many percent the number of repetitions of the SID 36 indicating real data transfer has advanced with respect to the total number of times.

The series of processing is repeated until reprogramming is completed. Furthermore, the gateway device 10 that becomes the reprogramming master device RM obtains the progress and the traveling propriety information from the reprogramming slave device RS in step Y15, and commands the display (e.g., 5a) to display them in step Y16. In this context, the gateway device 10 that becomes the reprogramming master device RM can periodically obtain progress information from the reprogramming slave device RS by outputting a service ID (SID 22).

According to such a mode, processing load can be shared between the gateway device 10 and the reprogramming slave device RS. Since completion timing of reprogramming is determined on the basis of completion information from the reprogramming slave device RS, the reprogramming completion timing can be precisely determined.

As illustrated in the above-mentioned embodiments and the present embodiment, determination processing of traveling propriety and determination processing of progress may be performed by any of the reprogramming master device RM and the reprogramming slave device RS.

Other Embodiments

The present disclosure is not limited to the above-mentioned embodiments, and various modifications are possible, and the present disclosure can be applied to various embodiments within a scope that does not depart from the gist of the present disclosure. For example, a modification or an extension described below is possible.

In the above-mentioned embodiments, although the mode is illustrated in which the reprogramming master device RM or the reprogramming slave device RS acquires the progress to make the display 46 display it, it is not limited to this, and the progress X1 may be confirmed by transmitting the progress to the center device 4 on the side of the web server 3 and accessing to the web server 3 by operating the operation unit 5b of the mobile terminal 5 by the user. In this case, the web server 3 is configured as a notification medium. The same applied to the above-mentioned traveling propriety information X2.

The relationship between CAN ID and the name of the ECU, and the traveling propriety set in the table TA1 of the above-mentioned embodiments is only an example, and it is not limited to this.

In the above-mentioned embodiments, although a mode is illustrated in which each of the ECUs 22 to 31 for various systems is connected to corresponding one of the buses 12 to 14 such as the body system bus 12, the traveling system bus 13, and the multimedia system bus 14, the types of the ECUs are not limited to the ECUs described in the above-described embodiments.

In the above-mentioned embodiments, although the mode is illustrated in which each of the ECUs 22 to 31 for various systems is connected to corresponding one of the buses 12 to 14 such as the body system bus 12, the traveling system bus 13, and the multimedia system bus 14, it is not limited to this. For example, some or all of the ECUs 22 to 31 may be connected to one bus. Specifically, in the above-mentioned embodiments, the ECUs 22 to 25 connected to the body system bus 12 and the ECUs 30, 31 connected to the multimedia system bus 14 may be connected to the same bus. Also, the systems of the connection buses of the ECUs 22 to 31 may be changed. Also, at least not less than two functions of the respective ECUs 22 to 31 may be integrated into one ECU.

In the vehicle system 1 of the above-mentioned embodiments, the mode is illustrated in which the gateway device 10 is used as the reprogramming master device RM, but it is not limited to this. For example, any one configuration among any of one of the ECUs other than the ECU that functions as the reprogramming slave device RS, the mobile terminal 5, and the monitor tool 48 may be made to function as the reprogramming master device RM.

In the vehicle system 1 of the above-mentioned embodiments, the mode is illustrated in which the gateway device 10 is equipped with the traveling propriety determination table TA1, but it is not limited to this. For example, the traveling propriety determination table TA1 may be stored in any of the ECUs 22 to 31 and the mobile terminals 5 to share the traveling propriety determination table TA1 in the system 1.

Although the mode is illustrated in which the LED 38 is connected to the gateway device 10, the LED 38 may be connected to one of the other ECUs 22 to 31. Although the mode is illustrated in which the display 46 is connected to the navi ECU 30, the display 46 may be connected to one of the ECUs 22 to 29, 31.

The above-described various sensors (e.g., the detection sensor of on/off state of the parking brake, the shift lever position sensor, the gasoline remaining amount sensor) may not be connected to the above-described target ECUs. The various sensors (e.g., the detection sensor of on/off state of the parking brake, the shift lever position sensor, the gasoline remaining amount sensor) may be connected to another ECU other than the above-mentioned ECUs, and the gateway device 10 and the other ECU may obtain the sensor information via the buses 11 to 15 by communication.

Although the mode is illustrated in which the displays 5a, 46 that become a notification medium is selected to display various messages, the notification medium is not limited to them described in the above-mentioned embodiments, and the present disclosure may be applied to a mode in which sound is notified via a speaker mounted on the vehicle via, for example, the navi ECU 30 or an audio ECU (not shown).

Although the mode is illustrated in which the flash memories 35, 45 are used as a storage unit, it is not limited to this. For example, a volatile memory such as a RAM and a non-volatile memory such as an EEPROM may be used as the storage units. The above-mentioned plurality of embodiments may be combined.

Although the embodiment is illustrated that specifies boarding/alighting state of the vehicle user on the premise that the mobile terminal 5 exists around the vehicle in step V2 of FIG. 16, it is not limited to this. That is, step V2 may be provided as needed.

Description of Correspondence Relation Between Present Disclosure and Above-Mentioned Embodiments Correspondence relation between the present disclosure and the above-mentioned embodiments will be described. Any of the mobile terminal 5, the gateway device 10, the ECUs other than the reprogramming slave device RS, the monitor tool 48 composes the reprogramming master device RM. Not less than any one of the ECUs 22 to 31 composes the reprogramming slave device RS. The microcomputer 36 or 41 of the reprogramming master device RM is composed as an obtaining unit for obtaining traveling propriety. Furthermore, the microcomputer 36 or 41 of the reprogramming master device RM is composed as a boarding/alighting state determination unit that determines a boarding/alighting state of the vehicle occupant. Furthermore, the microcomputer 36 or 41 of the reprogramming master device RM is composed as a vehicle state determination unit for determining an operation/non-operation state of the engine. Furthermore, the microcomputer 36 or 41 of the reprogramming master device RM is composed as an interruption request unit that transmits an interruption command to the reprogramming slave device RS to request interruption of rewriting processing of the update file when an interruption request is received from the terminal 5, 46 operated by the vehicle user. Furthermore, the microcomputer 36 or 41 of the reprogramming master device RM is composed as a reprogramming execution command unit that commands the reprogramming slave device RS to execute reprogramming. Furthermore, the microcomputer 36 or 41 of the reprogramming master device RM is composed as a stable state keeping request unit that requests all of the ECUs including the reprogramming slave device RS to keep propriety state of reprogramming and state of traveling propriety when the reprogramming execution command unit transmits a reprogramming execution command to the reprogramming slave device RS.

Furthermore, the microcomputer 36 or 41 of the reprogramming master device RM is composed as a notification command unit that commands a notification medium (the mobile terminal 5, the LED 38, the display 46) to notify the information according to the traveling propriety signal. The microcomputer 36 or 41 of the reprogramming master device RM is composed as a distance specification unit for specifying a distance between the terminal 5 operated by the vehicle user and the vehicle. In this context, the microcomputer 36 or 41 of the reprogramming master device RM is composed as a presence/absence determination unit that determines whether the terminal exists around the vehicle depending on the distance specified by the distance specification unit. The microcomputer 36 or 41 of the reprogramming master device RM is composed as a boarding/alighting state specification unit. The web server 3, the display 5*a*, the LED 38, and the display 46 are composed as a notification medium that notifies traveling propriety or progress. Specifically, the display 46 is composed as a vehicle display device. The flash memories 35, 45, and the like are composed as a storage unit.

Description of Other Viewpoint

Furthermore, in each embodiment, the reprogramming master device RM is configured to provide the function of at least some of a progress determination unit that determines progress, a progress notification command unit that commands notification of progress, a progress notification controller that controls notification of progress, a progress display controller that controls display of progress, a progress obtaining unit that obtains progress, and a traveling propriety determination unit that determines traveling propriety of the vehicle. The reprogramming slave device RS may have the functions as the progress determination unit, the traveling propriety determination unit.

Note that, in the drawings, 1 denotes vehicle system, 3 denotes web server (notification medium), RM denotes reprogramming master device (vehicle device), RS denotes reprogramming slave device, 36 denotes microcomputer (determination unit, obtaining unit, notification command unit, reprogramming execution command unit, boarding/alighting state determination unit, vehicle state determination unit, distance specification unit, presence/absence determination unit), 41 denotes microcomputer (determination unit, obtaining unit, notification command unit, reprogramming execution instruction unit, boarding/alighting state determination unit, vehicle state determination unit), 5 denotes mobile terminal (notification medium, terminal), 35 denotes flash memory (storage unit), 38 denotes LED (notification medium), 45 denotes flash memory (storage unit), 46 denotes display (vehicle display device, terminal, notification medium), and TA1 denotes traveling propriety determination table.

For example, a function owned by one component may be dispersed into a plurality of components, and a function owned by a plurality of components may be integrated into one component. Also, at least a part of the configuration of the above-described embodiments may be replaced with a known configuration having a similar function. Also, a part or all of the configuration of the above-mentioned not less than two embodiments may be combined for adding or may be replaced with each other. Note that, reference numerals in parenthesis described in Claims illustrate correspondence with the specific means described in the above-mentioned embodiments as an aspect of the present disclosure, and do not limit the technical scope of the present disclosure.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. A vehicle device as a gateway device or a reprogramming master device configured to transmit an update file to an ECU as a reprogramming slave device among a plurality of ECUs in a vehicle system in response to a request from a terminal operable by a vehicle user to control updating of a program stored in the ECU, the vehicle device comprising:
   a processor; and
   a memory storing instructions configured to, when executed by the processor, cause the processor to:
   obtain traveling propriety of a vehicle when the update file is rewritten in the reprogramming slave device, and
   command a notification medium, in response to receiving notification of an event occurrence from outside of the vehicle, to
   allow the vehicle user to choose whether to download the update file or not to download the update file from outside of the vehicle while notifying information of the travelling propriety,
   allow the vehicle user to choose whether to execute the updating of the program or not to execute the updating the program while notifying the information of the travelling propriety, based on a condition that the vehicle user chooses to download the update file from outside of the vehicle and then the update file is completely downloaded, and
   notify of a required time until the vehicle is permitted to travel based on the information of the travelling propriety, before the user choosing to execute the updating of the program.

2. The vehicle device according to claim 1, wherein the instructions stored in the memory are further configured to, when executed by the processor, cause the processor to determine the travel propriety of the vehicle when the update file is rewritten in the reprogramming slave.

3. The vehicle device according to claim 1,
   wherein the instructions stored in the memory are further configured to, when executed by the processor, cause the processor to transmit an interruption command to the reprogramming slave device to request interruption of rewriting processing of the update file when an interruption request is received from the terminal operated by the vehicle user or when a vehicle state needs rewriting interruption due to user operation.

4. The vehicle device according to claim 1,
   wherein the instructions stored in the memory are further configured to, when executed by the processor, cause the processor to:

store a traveling propriety determination table with information of correlation between traveling propriety of the ECU being the reprogramming slave device and at least one of a CAN ID of the ECU, a connection bus of the ECU, or a name of the ECU;
determine the traveling propriety by referring to the traveling propriety determination table for at least one of the CAN ID, the connection bus, or the name of the ECU being the reprogramming slave device; and
command the notification medium to notify information of the traveling propriety determined by the processor.

5. The vehicle device according to claim 4, wherein the instructions stored in the memory are further configured to, when executed by the processor, cause the processor to command the reprogramming slave device to execute reprogramming when the traveling propriety of the ECU corresponding to the reprogramming slave device stored in the traveling propriety determination table is determined as being permitted in traveling by the processor.

6. The vehicle device according to claim 1,
wherein the instructions stored in the memory are further configured to, when executed by the processor, cause the processor to:
instruct the reprogramming slave device to execute reprogramming; and
request all of the ECUs including the reprogramming slave device to keep a propriety state of reprogramming and a state of the traveling propriety when the processor transmits a reprogramming execution command to the reprogramming slave device.

7. The vehicle device according to claim 6, wherein the instructions stored in the memory are further configured to, when executed by the processor, cause the processor to:
determine a boarding/alighting state of a vehicle occupant, and determine a vehicle state; and
request all of the ECUs including the reprogramming slave device to keep the propriety state of reprogramming and the state of the traveling propriety when the processor determines that the vehicle occupant is not boarding, and determines that the vehicle state satisfies one or more predetermined conditions.

8. The vehicle device according to claim 7, wherein:
the vehicle system further includes a data communication module (DCM) configured to communicate with a file server, which stores the update file;
the instructions stored in the memory are configured to, when executed by the processor, further cause the processor to determine whether the vehicle state satisfies the one or more predetermined conditions;
the one or more predetermined conditions include a plurality of predetermined conditions; and
the plurality of predetermined conditions includes
a condition in which no abnormal diagnosis occurs in the reprogramming master device, the DCM, and the reprogramming slave device,
a condition in which operating temperatures of the reprogramming master device, the DCM, and the reprogramming slave device are within an adequate operating temperature range,
a condition in which the reprogramming slave device or the ECU related to the reprogramming slave device is not used,
a condition in which the voltage value of the battery power source for operating the vehicle device is equal to or larger than the predetermined value,
a condition in which a remaining amount of gasoline is sufficient,
a condition in which a confirmation is received by the vehicle user, and
a condition in which an update file as a target of reprogramming is stored in the reprogramming master device.

9. The vehicle device according to claim 7,
wherein, when requesting all of the ECUs including the reprogramming slave device to keep the propriety state of reprogramming and the state of the traveling propriety, the instructions stored in the memory are further configured to, when executed by the processor, cause the processor to request
a condition to keep the propriety state of reprogramming of each of the ECUs,
a condition to hold a state of an ignition power source or an accessory power source even when a switch for engine start/stop is operated by the user to keep a disabled state of power supply stop to each of the ECUs,
a condition to keep a door lock state even when a wireless operation command is received by a wireless key, a smart key, or the like used for key less entry, and
a condition to keep a shift position at a parking state.

10. The vehicle device according to claim 1, wherein the instructions stored in the memory are further configured to, when executed by the processor, cause the processor to obtain a signal indicating the traveling propriety from the reprogramming slave device commanded to execute reprogramming, or another ECU other than the ECU, which is the reprogramming slave device.

11. The vehicle device according to claim 10,
wherein the instructions stored in the memory are further configured to, when executed by the processor, cause the processor to preferentially command the notification medium to notify information indicating that traveling is prohibited when a plurality of traveling propriety signals is received from the reprogramming slave device or the other ECU.

12. The vehicle device according to claim 1,
wherein the terminal operable by the vehicle user includes a portable terminal carried by the vehicle user and a vehicular notification device adapted to the vehicle,
wherein the instructions stored in the memory are further configured to, when executed by the processor, cause the processor to:
determine whether or not the vehicle user is in the vehicle;
control the vehicular notification device to notify of the information of the travelling propriety, in response to determining that the vehicle user is in the vehicle; and
control the portable terminal as the notification medium to notify of the information of the travelling propriety, in response to determining that the vehicle user is not in the vehicle.

13. The vehicle device according to claim 1,
wherein the instructions are configured to, when executed by the processor, further cause the processor to:
notify of the required time based on the information of the travelling propriety, before allowing the vehicle user whether to choose to download the update file.

14. The vehicle device according to claim 1,
wherein the instructions are configured to, when executed by the processor, further cause the processor to:

notify of a content related to the update file, before allowing the vehicle user whether to choose to download the update file.

15. The vehicle device according to claim 1, wherein the instructions are configured to, when executed by the processor, further cause the processor to:
allow the vehicle user to choose whether to interrupt the updating of the program through the notification medium, after beginning of the updating of the program.

16. The vehicle device according to claim 1, wherein the instructions are configured to, when executed by the processor, further cause the processor to:
control the notification medium to output the information of the travelling propriety, the required time, and a progress of the updating of the program based on the information of the travelling propriety, after beginning of the updating of the program.

17. The vehicle device according to claim 1, wherein the notification medium is a mobile terminal, and
the instructions are configured to, when executed by the processor, further cause the processor to display the information of the travelling propriety and the required time on a screen of the mobile terminal based on the information of the travelling propriety, before allowing the vehicle whether to execute the updating of the program.

18. The vehicle device according to claim 1, wherein the notify is an output of the required time until the vehicle is permitted to travel based on the information of the travelling propriety before allowing the vehicle user to choose whether to execute the updating of the program.

19. A vehicle device as a gateway device or a reprogramming master device configured to transmit an update file to an ECU as a reprogramming slave device among a plurality of ECUs in a vehicle system in response to a request from a terminal operable by a user of a vehicle to control updating of a program stored in the ECU, the vehicle device comprising:
a processor; and
a memory storing instructions configured to, when executed by the processor, cause the processor to:
command a notification medium, in response to receiving notification of an event occurrence from outside of the vehicle, to
allow the user to choose whether to download the update file or not to download the update file from outside of the vehicle while notifying information as to whether or not the vehicle is permitted to travel during downloading of the update file, and
allow the user to choose whether to execute the updating of the program or not to execute the updating the program while notifying the information as to whether or not the vehicle is permitted to travel during the updating of the program, based on a condition that the user chooses to download the update file from outside of the vehicle and then the update file is completely downloaded, and
notify of a required time until the vehicle is permitted to travel based on the information, before the user choosing to execute the updating of the program.

20. The vehicle device according to claim 19, wherein the terminal operable by the vehicle user includes a portable terminal carried by the vehicle user and a vehicular notification device adapted to the vehicle,
wherein the instructions stored in the memory are further configured to, when executed by the processor, cause the processor to:
determine whether or not the vehicle user is in the vehicle;
control the vehicular notification device to notify of the information of the travelling propriety, in response to determining that the vehicle user is in the vehicle; and
control the portable terminal to notify of the information of the travelling propriety, in response to determining that the vehicle user is not in the vehicle.

21. A reprogramming system comprising:
a reprograming slave device as one of a plurality of ECUs connected to an in-vehicle network of a vehicle, the reprogramming slave configured to update a program stored in the reprogramming slave;
a reprograming master device as another one of the plurality of ECUs; and
a notification medium configured to notify a user of the vehicle of information related to updating of the program,
wherein the reprogramming master device includes:
a processor; and
a memory storing instructions configured to, when executed by the processor, cause the processor to:
execute control of
downloading of an update file for the updating of the program based on an external request, and
the updating of the program stored in reprogramming slave;
notify a user of the vehicle of information related to the updating of the program;
determine, before the downloading of the update file, travel propriety information as to whether or not the vehicle is permitted to travel during the updating of the program stored in the reprogramming slave device after completion of the downloading of update data;
execute a command for the user to choose whether or not to download the file for the updating of the program while notifying the travel propriety information through the notification medium before the downloading of the update file, in response to receiving notification of an event occurrence from outside of the vehicle; and
notify, through the notification medium, of a required time until the vehicle is permitted to travel based on a condition that the travel propriety information indicates that the vehicle is not permitted to travel during the updating of the program, before starting the updating of the program by adopting the file for the updating of the program.

22. The vehicle device according to claim 21, wherein the notification medium includes a portable terminal carried by the vehicle user and a vehicular notification device adapted to the vehicle,
wherein the instructions stored in the memory are further configured to, when executed by the processor, cause the processor to:
determine whether or not the vehicle user is in the vehicle;

control the vehicular notification device to notify of the information of the travelling propriety, in response to determining that the vehicle user is in the vehicle; and control the portable terminal as the notification medium to notify of the information of the travelling propriety, in response to determining that the vehicle user is not in the vehicle.

23. A reprogramming master device as one of a plurality of ECUs connected to an in-vehicle network of a vehicle, the reprogramming master device comprising:

a processor; and a memory storing instructions configured to, when executed by the processor, cause the processor to:

execute control of
transmission of a file for updating of a program based on an external request to a reprogramming slave device as another one of the ECUs, and
updating of a program stored in the reprogramming slave device;

communicate with one or more of the ECUs other than the reprogramming slave device and the reprogramming master device;

determine whether or not the updating of the program is executable based on a state of the vehicle, command the reprogramming slave device to execute the updating of the program, in response to determining that the updating of the program is executable;

determine whether or not the vehicle is permitted to travel during the updating of the program according to a determination result before commanding the reprogramming slave device to execute the updating of the program, and command a notification medium to notify of travel propriety information as to whether or not the vehicle is permitted to travel during the updating of the program according to the determination result before commanding the reprogramming slave device to execute the updating of the program;

determine whether or not the vehicle is permitted to travel during the updating of the program according to a determination result after commanding the reprogramming slave device to execute the updating of the program, and command a notification medium to notify of travel propriety information as to whether or not the vehicle is permitted to travel during the updating of the program according to the determination result after commanding the reprogramming slave device to execute the updating of the program; and notify, through the notification medium, of a required time until the vehicle is permitted to travel based on a condition that the travel propriety information indicates that the vehicle is not permitted to travel during the updating of the program, prior to commanding the reprogramming slave device to execute the updating of the program.

24. The reprogramming master device according to claim 23,
wherein the instructions are configured to, when executed by the processor, further cause the processor to:
calculate a progress level of the updating of the program; and
command notification of the progress level and the travel propriety information, and cause the notification medium to display the progress level and the travel propriety information.

25. The reprogramming master device according to claim 24,
wherein the instructions are configured to, when executed by the processor, further cause the processor to:
calculate a remaining time until the vehicle is permitted to travel; and
command notification of the progress level, the remaining time, and the travel propriety information, and cause the notification medium to display the progress level, the remaining time, and the travel propriety information.

26. The reprogramming master device according to claim 25,
wherein the instructions are configured to, when executed by the processor, further cause the processor to cause the notification medium to display the progress level, the remaining time, the travel propriety information, and an input button for interruption of the updating of the program.

27. The vehicle device according to claim 23,
wherein the notification medium includes a portable terminal carried by the vehicle user and a vehicular notification device adapted to the vehicle,
wherein the instructions stored in the memory are further configured to, when executed by the processor, cause the processor to:
determine whether or not the vehicle user is in the vehicle;
control the vehicular notification device to notify of the information of the travelling propriety, in response to determining that the vehicle user is in the vehicle; and
control the portable terminal as the notification medium to notify of the information of the travelling propriety, in response to determining that the vehicle user is not in the vehicle.

* * * * *